(12) United States Patent
Totadamane Ramappa et al.

(10) Patent No.: US 12,520,381 B2
(45) Date of Patent: Jan. 6, 2026

(54) TECHNIQUES FOR EMERGENCY SERVICE FALL BACK ERROR HANDLING

(71) Applicant: Apple Inc., Cupertino, CA (US)

(72) Inventors: Shashanka Totadamane Ramappa, Shivamogga (IN); Krisztian Kiss, Rancho Santa Fe, CA (US); Madhusudhan Cheripally, Bengaluru (IN); Michael Lee, San Diego, CA (US); Pradeep Pangi, Bengaluru (IN); Rajkumar Krishnaperumal, Bengaluru (IN); Sridhar Prakasam, Fremont, CA (US)

(73) Assignee: Apple Inc., Cupertino, CA (US)

( * ) Notice: Subject to any disclaimer, the term of this patent is extended or adjusted under 35 U.S.C. 154(b) by 343 days.

(21) Appl. No.: 18/251,780

(22) PCT Filed: Oct. 12, 2021

(86) PCT No.: PCT/US2021/054528
§ 371 (c)(1),
(2) Date: May 4, 2023

(87) PCT Pub. No.: WO2022/098475
PCT Pub. Date: May 12, 2022

(65) Prior Publication Data
US 2023/0413382 A1    Dec. 21, 2023

(30) Foreign Application Priority Data
Nov. 4, 2020   (IN) .............................. 202011048154

(51) Int. Cl.
*H04W 4/00*      (2018.01)
*H04W 76/18*     (2018.01)
*H04W 76/50*     (2018.01)

(52) U.S. Cl.
CPC ........... *H04W 76/50* (2018.02); *H04W 76/18* (2018.02)

(58) Field of Classification Search
CPC .............................. H04W 76/50; H04W 76/18
See application file for complete search history.

(56) References Cited

U.S. PATENT DOCUMENTS

2015/0063315 A1* 3/2015 Yang ................. H04W 74/0833
                                                    370/335
2016/0227469 A1* 8/2016 Kim .................... H04L 65/1016
(Continued)

FOREIGN PATENT DOCUMENTS

EP         2723126 A1     4/2014
WO     2019245007 A1    12/2019
(Continued)

*Primary Examiner* — Omoniyi Obayanju
(74) *Attorney, Agent, or Firm* — Blank Rome LLP

(57) ABSTRACT

A technique for establishing a voice call including receiving an indication that the first wireless system supports emergency service fallback, receiving an indication to establish an emergency voice call, transmitting an emergency service request to the first wireless system, determining that an unexpected error has occurred, selecting a second wireless system based on the determination that the unexpected error has occurred, and connecting to the second wireless system to complete the emergency voice call. Additionally, a technique for cancelling a voice call including receiving an indication that the first wireless system supports emergency service fallback, receiving an indication to establish an emergency voice call, transmitting an emergency service request to the first wireless system, receiving an indication to cancel the emergency voice call, and cancelling a connection to a second wireless system.

6 Claims, 16 Drawing Sheets

(56) References Cited

U.S. PATENT DOCUMENTS

| | | |
|---|---|---|
| 2020/0120470 A1 | 4/2020 | Arshad |
| 2020/0187295 A1* | 6/2020 | Li .................... H04W 76/16 |
| 2021/0321356 A1* | 10/2021 | Won .................. H04W 60/02 |
| 2022/0038879 A1* | 2/2022 | Won .................. H04W 76/38 |

FOREIGN PATENT DOCUMENTS

| | | |
|---|---|---|
| WO | 2020001739 A1 | 1/2020 |
| WO | 2020069760 A1 | 4/2020 |

\* cited by examiner

TECHNIQUES FOR EMERGENCY SERVICE FALL BACK ERROR HANDLING

FIELD

The present application relates to wireless devices including devices, computer-readable media, and methods for implementing techniques for emergency service fall back (ESFB) error handling.

BACKGROUND

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1×RTT, 1×EV-DO, HRPD, eHRPD), IEEE 802.11 (WLAN or Wi-Fi), BLUETOOTH, etc.

The ever increasing number of features and functionality introduced in wireless communication devices also creates a continuous need for improvement in both wireless communications and in wireless communication devices. To increase coverage and better serve the increasing demand and range of envisioned uses of wireless communication, in addition to the communication standards mentioned above, there are further wireless communication technologies under development, including fifth generation (5G) new radio (NR) communication. Accordingly, improvements in the field in support of such development and design are desired.

SUMMARY

Aspects relate to devices, computer-readable media, and methods for establishing a voice call. These aspects include connecting, by a wireless device, to a first wireless system, receiving an indication that the first wireless system supports emergency service fallback, receiving an indication to establish an emergency voice call, transmitting an emergency service request to the first wireless system, determining that an unexpected error has occurred, selecting a second wireless system based on the determination that the unexpected error has occurred, and connecting to the second wireless system to complete the emergency voice call.

Another aspect relates to A wireless device comprising: an antenna; a radio operably coupled to the antenna; and a processor operably coupled to the radio, wherein the wireless device is configured to: connect, by a wireless device, to a first wireless system; receive an indication that the first wireless system supports emergency service fallback; receive an indication to establish an emergency voice call; transmit an emergency service request to the first wireless system; determine that an unexpected error has occurred; select a second wireless system based on the determination that the unexpected error has occurred; and connect to the second wireless system to complete the emergency voice call.

Another aspect relates to devices, computer-readable media, and methods for cancelling a call. These aspects include connecting, by a wireless device, to a first wireless system, receiving an indication that the first wireless system supports evolved packet system (EPS) fallback, receiving an indication to establish a voice call, transmitting a service request to the first wireless system, receiving an indication to cancel the voice call, receiving a radio resource control (RRC) release message redirecting the wireless device to a second wireless system, ignoring the RRC release message in response to the indication to cancel, and remaining connected to the first wireless system.

Another aspect relates to relates to devices, computer-readable media, and methods for cancelling a call. These aspects include connecting, by a wireless device, to a first wireless system, receiving an indication that the first wireless system supports EPS fallback, receiving an indication to establish a voice call, transmitting a service request to the first wireless system, receiving a radio resource control (RRC) release message redirecting the wireless device to a second wireless system, initiating a connection procedure with the second wireless system, receiving an indication to cancel the voice call, stopping the connection procedure with the second wireless system in response to the indication to cancel, and reconnecting to the first wireless system.

Another aspect relates to relates to devices, computer-readable media, and methods for cancelling a call. These aspects include connecting, by a wireless device, to a first wireless system, receiving an indication that the first wireless system supports EPS fallback, receiving an indication to establish a voice call, transmitting an service request to the first wireless system, receiving a radio resource control (RRC) release message redirecting the wireless device to a second wireless system, initiating a registration procedure with the second wireless system, receiving an indication to cancel the voice call, and reconnecting to the first wireless system after completing the registration procedure with the second wireless system in response to the indication to cancel.

The techniques described herein may be implemented in and/or used with a number of different types of devices, including but not limited to cellular phones, wireless devices, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF DRAWINGS

A better understanding of the present subject matter can be obtained when the following detailed description of various aspects is considered in conjunction with the following drawings.

Figure 1:
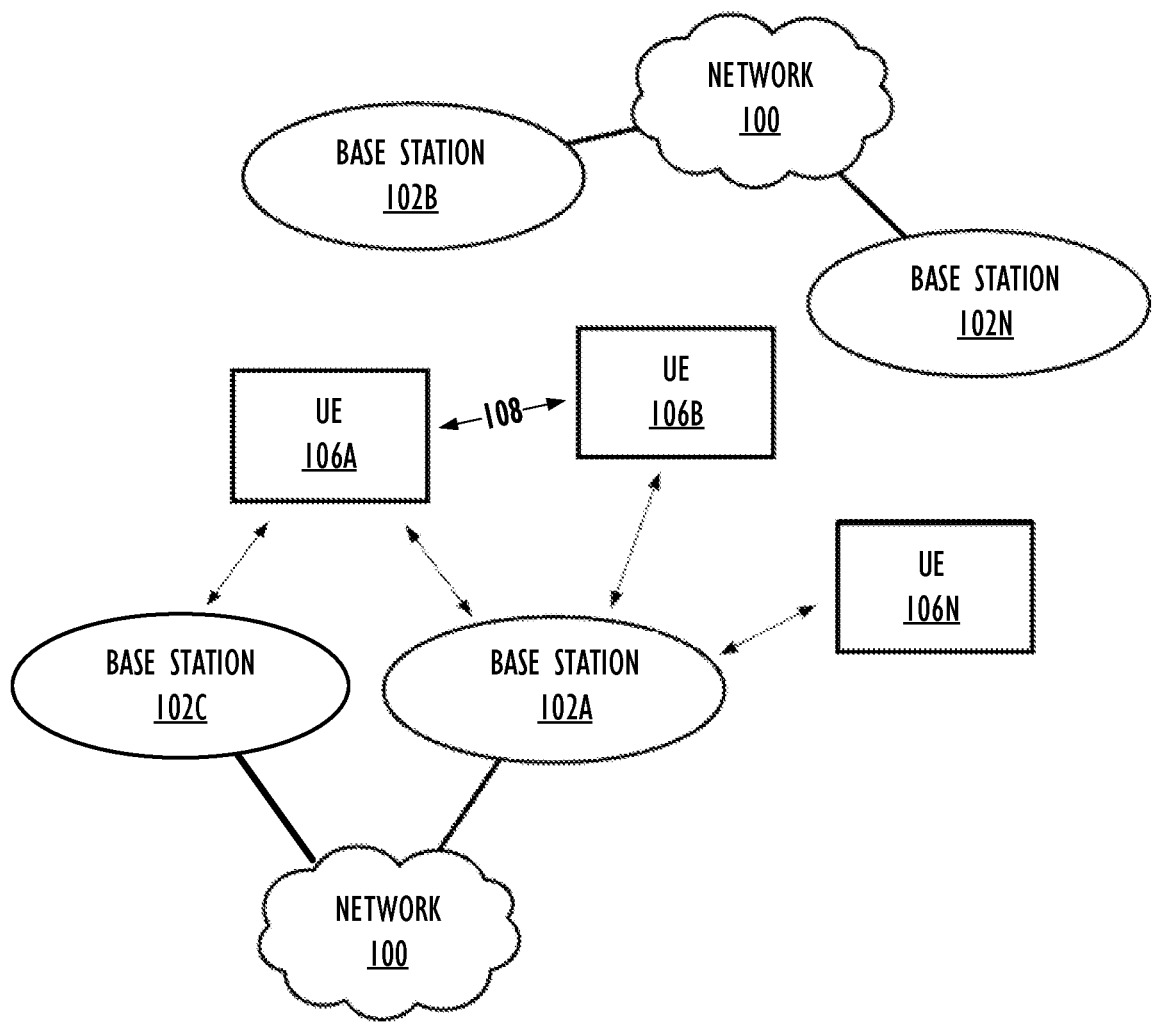
FIG. 1 illustrates an example wireless communication system, according to some aspects.

While the features described herein may be susceptible to various modifications and alternative forms, specific aspects thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Some wireless systems may be deployed without direct support for emergency voice calls. For example, a wireless system may be deployed optimized for data transmissions. Such systems may be configured with emergency service fall back (ESFB) to redirect, or fall back, to another wireless system for emergency voice calls initiated by a user of a wireless device connected to the wireless system. In some cases, errors during the fall back procedure may be encountered. Left unhandled, these errors may cause the emergency call to be delayed or to fail. Additionally, a user may attempt to cancel the emergency call after initiating the call. What is needed are defined behaviors to handle possible errors or cancellation when attempting to set up an emergency call.

The following is a glossary of terms that may be used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic."

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (also "User Device" or "UE Device")— any of various types of computer systems or devices that are mobile or portable and that perform wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g., smart watch, smart glasses), PDAs, portable Internet devices, music players, data storage devices, other handheld devices, in-vehicle infotainment (IVI), in-car entertainment (ICE) devices, an instrument cluster, head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, machine type communications (MTC) devices, machine-to-machine (M2M), internet of things (IoT) devices, etc. In general, the term "UE" or "UE device" can be broadly defined to encompass any electronic, computing, and/or telecommunications device (or combination of devices) which is transportable by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "base station" or "wireless station" has the full breadth of its ordinary meaning, and at least includes a wireless communication station installed at a fixed location and used to communicate as part of a wireless telephone system or radio system. For example, if the base station is implemented in the context of LTE, it may alternately be referred to as an 'eNodeB' or 'eNB'. If the base station is implemented in the context of 5G NR, it may alternately be referred to as a 'gNodeB' or 'gNB'. Although certain aspects are described in the context of LTE or 5G NR, references to "eNB," "gNB," "nodeB," "base station," "NB," etc., may refer to one or more wireless nodes that service a cell to provide a wireless connection between user devices and a wider network generally and that the concepts discussed are not limited to any particular wireless technology. Although certain aspects are described in the context of LTE or 5G NR, references to "eNB," "gNB," "nodeB," "base station," "NB," etc., are not intended to limit the concepts discussed herein to any particular wireless technology and the concepts discussed may be applied in any wireless system.

Node—The term "node," or "wireless node" as used herein, may refer to one more apparatus associated with a cell that provide a wireless connection between user devices and a wired network generally.

Processing Element (or Processor)—refers to various elements or combinations of elements that are capable of performing a function in a device, such as a user equipment or a cellular network device. Processing elements may include, for example: processors and associated memory, portions or circuits of individual processor cores, entire processor cores, individual processors, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some aspects, "approximately" may mean within 0.1% of some specified or desired value, while in various other aspects, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Example Wireless Communication System

Turning now to FIG. 1, a simplified example of a wireless communication system is illustrated, according to some aspects. It is noted that the system of FIG. 1 is merely one example of a possible system, and that features of this disclosure may be implemented in any of various systems, as desired.

As shown, the example wireless communication system includes a base station 102A, which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station") and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an eNodeB' or 'eNB'. Note that if the base station 102A is implemented in the context of 5G NR, it may alternately be referred to as a 'gNodeB' or 'gNB'.

In some embodiments, the UEs 106 may be IoT UEs, which may comprise a network access layer designed for low-power IoT applications utilizing short-lived UE connections. An IoT UE can utilize technologies such as M2M or MTC for exchanging data with an MTC server or device via a public land mobile network (PLMN), proximity service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. As an example, vehicles to everything (V2X) may utilize ProSe features using a PC5 interface for direct communications between devices. The IoT UEs may also execute background applications (e.g., keep-alive messages, status updates, etc.) to facilitate the connections of the IoT network.

As shown, the UEs 106, such as UE 106A and UE 106B, may directly exchange communication data via a PC5 interface 108. The PC5 interface 105 may comprise one or more logical channels, including but not limited to a physical sidelink shared channel (PSSCH), a physical sidelink control channel (PSCCH), a physical sidelink shared channel (PSSCH), a physical sidelink downlink channel (PSDCH), a physical sidelink broadcast channel (PSBCH), and a physical sidelink feedback channel (PSFCH).

In V2X scenarios, one or more of the base stations 102 may be or act as Road Side Units (RSUs). The term RSU may refer to any transportation infrastructure entity used for V2X communications. An RSU may be implemented in or by a suitable wireless node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like. In one example, an RSU is a computing device coupled with radio frequency circuitry located on a roadside that provides connectivity support to passing vehicle UEs (vUEs). The RSU may also include internal data storage circuitry to store intersection map geometry, traffic statistics, media, as well as applications/software to sense and control ongoing vehicular and pedestrian traffic. The RSU may operate on the 5.9 GHz Direct Short Range Communications (DSRC) band to provide very low latency communications required for high speed events, such as crash avoidance, traffic warnings, and the like. Additionally or alternatively, the RSU may operate on the cellular V2X band to provide the aforementioned low latency communications, as well as other cellular communications services. Additionally or alternatively, the RSU may operate as a Wi-Fi hotspot (2.4 GHz band) and/or provide connectivity to one or more cellular networks to provide uplink and downlink communications. The computing device(s) and some or all of the radio frequency circuitry of the RSU may be packaged in a weatherproof enclosure suitable for outdoor installation, and may include a network interface controller to provide a wired connection (e.g., Ethernet) to a traffic signal controller and/or a backhaul network.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells." Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some aspects, base station 102A may be a next generation base station, e.g., a 5G New Radio (5G NR) base station, or "gNB." In some aspects, a gNB may be connected to a legacy evolved packet core (EPC) network and/or to a NR core (NRC)/5G core (5GC) network. In addition, a gNB cell may include one or more transition and reception points (TRPs). In addition, a UE capable of operating according to 5G NR may be connected to one or more TRPs within one or more gNBs. For example, it may be possible that that the base station 102A and one or more other base stations 102 support joint transmission, such that UE 106 may be able to receive transmissions from multiple base stations (and/or multiple TRPs provided by the same base station). For example, as illustrated in FIG. 1, both base station 102A and base station 102C are shown as serving UE 106A.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H), and/or any other wireless communication protocol, if desired. Other combinations of wireless communication standards (including more than two wireless communication standards) are also possible.

Example User Equipment (UE)

Figure 2:
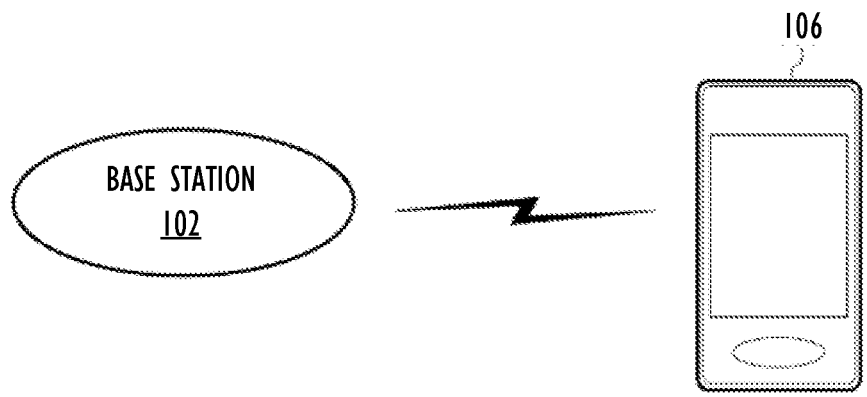
FIG. 2 illustrates a base station (BS) in communication with a user equipment (UE) device, according to some aspects.

FIG. 2 illustrates user equipment 106 (e.g., one of the devices 106A through 106N) in communication with a base station 102, according to some aspects. The UE 106 may be a device with cellular communication capability such as a mobile phone, a hand-held device, a computer, a laptop, a tablet, a smart watch or other wearable device, or virtually any type of wireless device.

The UE 106 may include a processor (processing element) that is configured to execute program instructions stored in memory. The UE 106 may perform any of the method aspects described herein by executing such stored instructions. Alternatively, or in addition, the UE 106 may include a programmable hardware element such as an FPGA (field-programmable gate array), an integrated circuit, and/or any of various other possible hardware components that are configured to perform (e.g., individually or in combination) any of the method aspects described herein, or any portion of any of the method aspects described herein.

The UE 106 may include one or more antennas for communicating using one or more wireless communication protocols or technologies. In some aspects, the UE 106 may be configured to communicate using, for example, NR or LTE using at least some shared radio components. As additional possibilities, the UE 106 could be configured to communicate using CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some aspects, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or either of LTE or 1×RTT, or either of LTE or GSM, among various possibilities), and separate radios for communicating using each of Wi-Fi and Bluetooth. Other configurations are also possible.

In some embodiments, a downlink resource grid can be used for downlink transmissions from any of the base stations 102 to the UEs 106, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid may comprise a number of resource blocks, which describe the mapping of certain physical channels to resource elements. Each resource block comprises a collection of resource elements. There are several different physical downlink channels that are conveyed using such resource blocks.

The physical downlink shared channel (PDSCH) may carry user data and higher-layer signaling to the UEs 106. The physical downlink control channel (PDCCH) may carry information about the transport format and resource allocations related to the PDSCH channel, among other things. It may also inform the UEs 106 about the transport format, resource allocation, and H-ARQ (Hybrid Automatic Repeat Request) information related to the uplink shared channel. Typically, downlink scheduling (assigning control and shared channel resource blocks to the UE 106 [102] within a cell) may be performed at any of the base stations 102 based on channel quality information fed back from any of the UEs 106. The downlink resource assignment information may be sent on the PDCCH used for (e.g., assigned to) each of the UEs.

The PDCCH may use control channel elements (CCEs) to convey the control information. Before being mapped to resource elements, the PDCCH complex-valued symbols may first be organized into quadruplets, which may then be permuted using a sub-block interleaver for rate matching.

Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Example Communication Device

Figure 3:
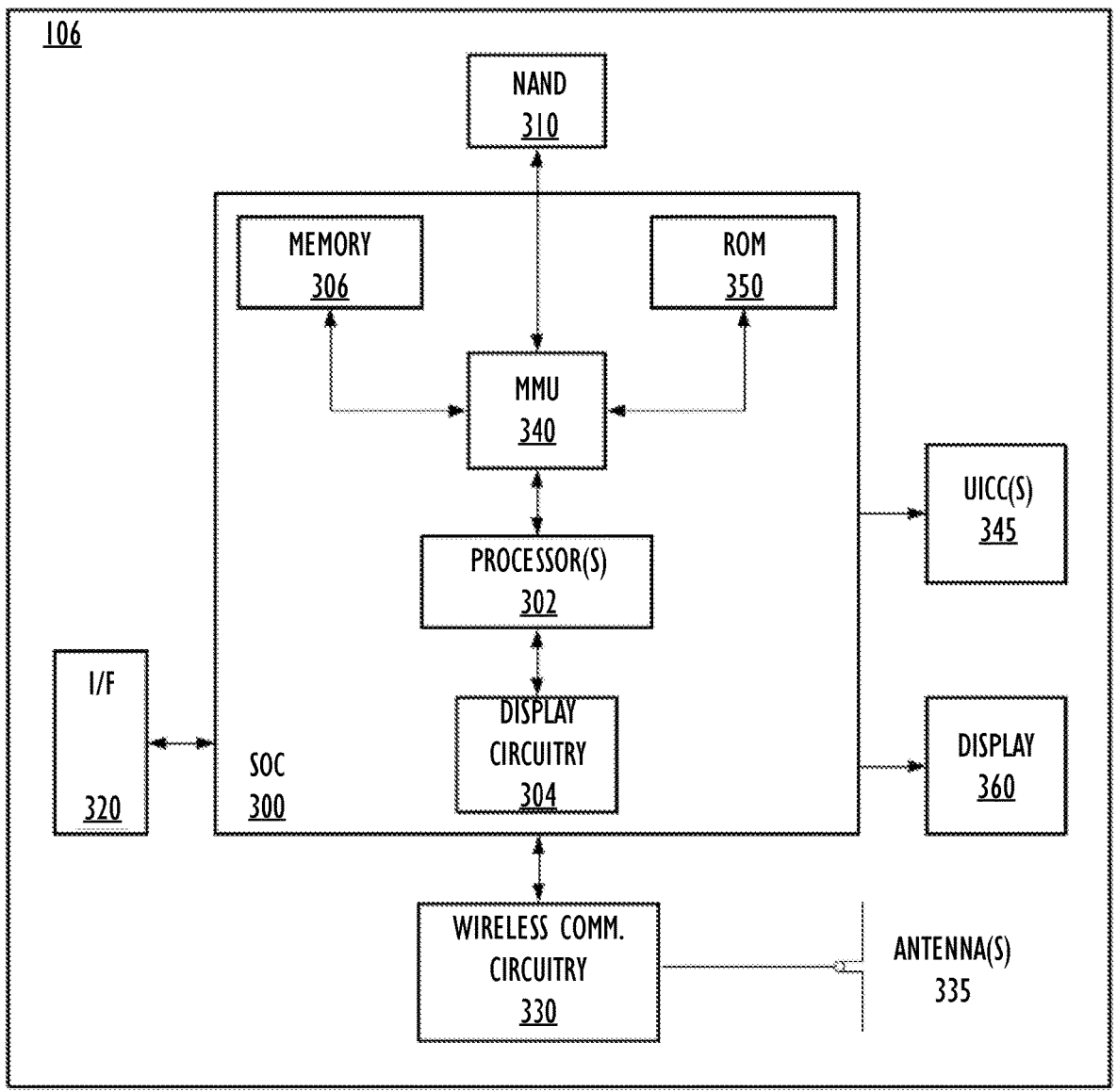
FIG. 3 illustrates an example block diagram of a UE, according to some Aspects.

FIG. 3 illustrates an example simplified block diagram of a communication device 106, according to some aspects. It is noted that the block diagram of the communication device of FIG. 3 is only one example of a possible communication device. According to aspects, communication device 106 may be a user equipment (UE) device, a mobile device or mobile station, a wireless device or wireless station, a desktop computer or computing device, a mobile computing device (e.g., a laptop, notebook, or portable computing device), a tablet, and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash memory 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and wireless communication circuitry 330 (e.g., for LTE, LTE-A, NR, UMTS, GSM, CDMA2000, Bluetooth, Wi-Fi, NFC, GPS, etc.). In some aspects, communication device 106 may include wired communication circuitry (not shown), such as a network interface card, e.g., for Ethernet.

The wireless communication circuitry 330 may couple (e.g., communicatively; directly or indirectly) to one or more antennas, such as antenna(s) 335 as shown. The wireless communication circuitry 330 may include cellular communication circuitry and/or short to medium range wireless communication circuitry, and may include multiple receive chains and/or multiple transmit chains for receiving and/or transmitting multiple spatial streams, such as in a multiple-input multiple output (MIMO) configuration.

In some aspects, as further described below, cellular communication circuitry 330 may include one or more receive chains (including and/or coupled to (e.g., communicatively; directly or indirectly) dedicated processors and/or radios) for multiple RATs (e.g., a first receive chain for LTE and a second receive chain for 5G NR). In addition, in some aspects, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with a second radio. The second radio may be dedicated to a second RAT, e.g., 5G NR, and may be in communication with a dedicated receive chain and the shared transmit chain. In some aspects, the second RAT may operate at mmWave frequencies. As mmWave systems operate in higher frequencies than typically found in LTE systems, signals in the mmWave frequency range are heavily attenuated by environmental factors. To help address this attenuating, mmWave systems often utilize beamforming and include more antennas as compared LTE systems. These antennas may be organized into antenna arrays or panels made up of individual antenna elements. These antenna arrays may be coupled to the radio chains.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, connector I/F 320, and/or display 360. The MMU 340 may be configured to perform memory protection and page table translation or set up. In some aspects, the MMU 340 may be included as a portion of the processor(s) 302.

As noted above, the communication device 106 may be configured to communicate using wireless and/or wired communication circuitry. As described herein, the communication device 106 may include hardware and software components for implementing any of the various features and techniques described herein. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, wireless communication circuitry 330 may include one or more processing elements. In other words, one or more processing elements may be included in wireless communication circuitry 330. Thus, wireless communication circuitry 330 may include one or more integrated circuits (ICs) that are configured to perform the functions of wireless communication circuitry 330. In addition, each integrated circuit may include circuitry (e.g., first circuitry, second circuitry, etc.) configured to perform the functions of wireless communication circuitry 330.

Example Base Station

Figure 4:
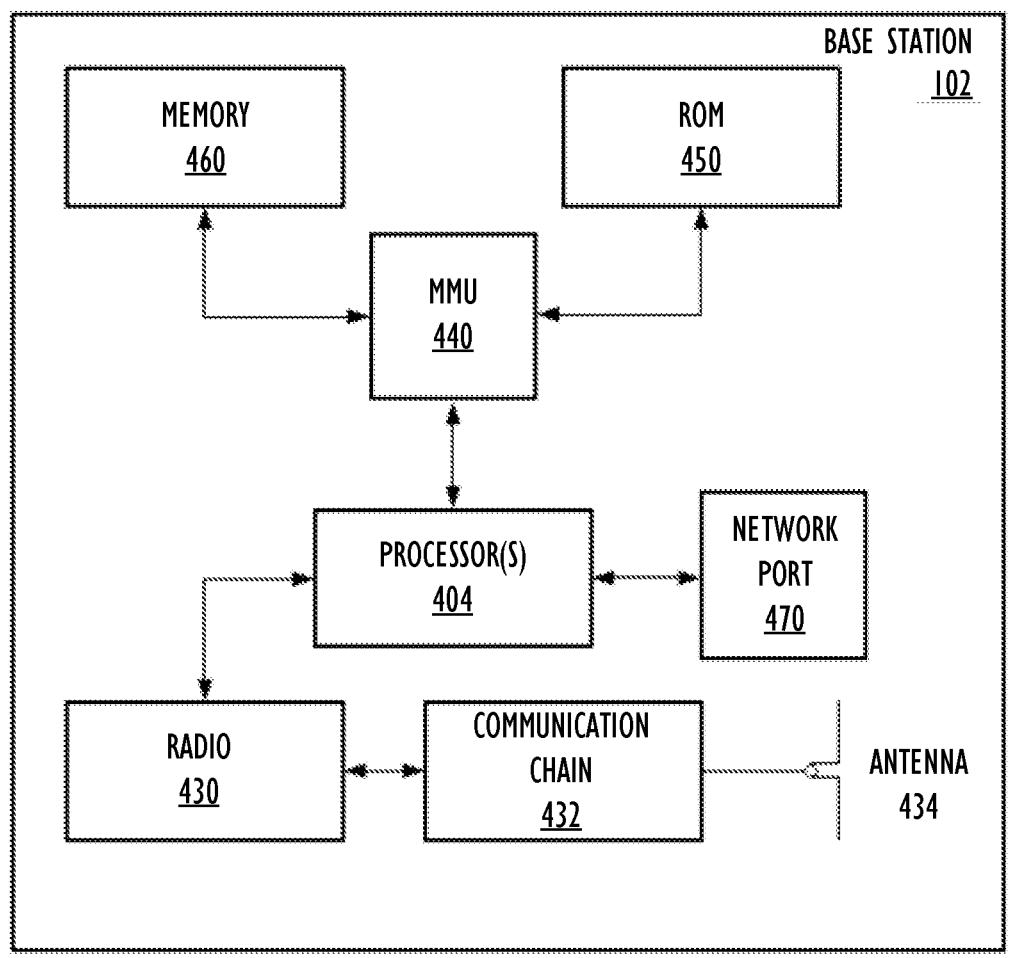
FIG. 4 illustrates an example block diagram of a BS, according to some aspects.

FIG. 4 illustrates an example block diagram of a base station 102, according to some aspects. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some aspects, base station 102 may be a next generation base station, e.g., a 5G New Radio (5G NR) base station, or "gNB." In such aspects, base station 102 may be connected to a legacy evolved packet core (EPC) network and/or to a NR core (NRC)/5G core (5GC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. When the base station 102 supports mmWave, the 5G NR radio may be coupled to one or more mmWave antenna arrays or panels. As another possibility, the base station 102 may include a multi-mode radio, which is capable of performing communications according to any of multiple wireless communication technologies (e.g., 5G NR and LTE, 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may include one or more processing elements. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may include one or more processing elements. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Example Cellular Communication Circuitry

Figure 5:
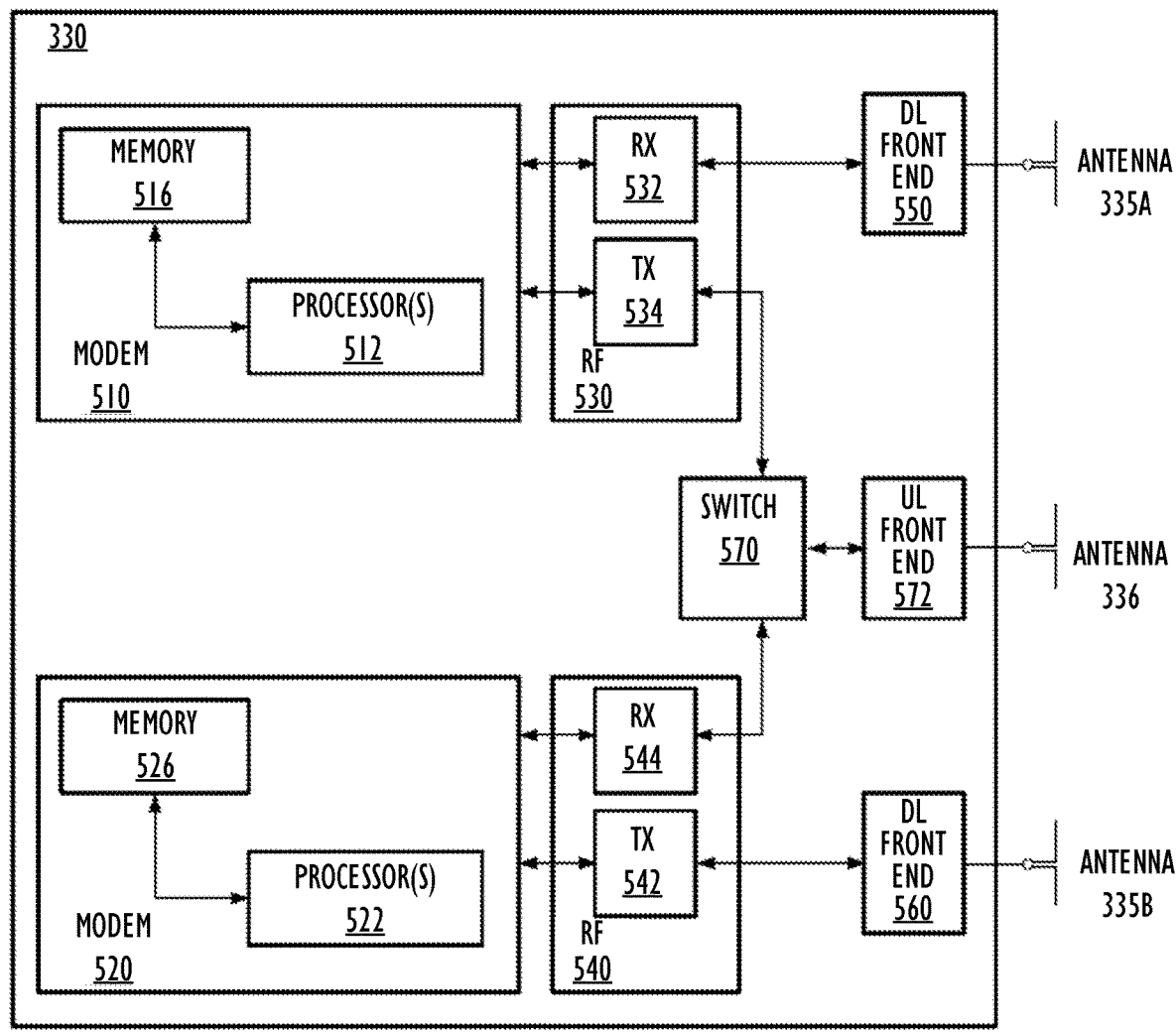
FIG. 5 illustrates an example block diagram of cellular communication circuitry, according to some aspects.

FIG. 5 illustrates an example simplified block diagram of cellular communication circuitry, according to some aspects. It is noted that the block diagram of the cellular communication circuitry of FIG. 5 is only one example of a possible cellular communication circuit; other circuits, such as circuits including or coupled to sufficient antennas for different RATs to perform uplink activities using separate antennas, or circuits including or coupled to fewer antennas, e.g., that may be shared among multiple RATs, are also possible. According to some aspects, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335*a-b* and 336 as shown.

In some aspects, cellular communication circuitry 330 may include dedicated receive chains (including and/or coupled to (e.g., communicatively; directly or indirectly) dedicated processors and/or radios) for multiple RATs (e.g., a first receive chain for LTE and a second receive chain for 5G NR). For example, as shown in FIG. 5, cellular communication circuitry 330 may include a first modem 510 and a second modem 520. The first modem 510 may be configured for communications according to a first RAT, e.g., such as LTE or LTE-A, and the second modem 520 may be configured for communications according to a second RAT, e.g., such as 5G NR.

As shown, the first modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some aspects, receive circuitry 532 may be in communication with downlink (DL) front end 550, which may include circuitry for receiving radio signals via antenna 335a.

Similarly, the second modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some aspects, receive circuitry 542 may be in communication with DL front end 560, which may include circuitry for receiving radio signals via antenna 335b.

In some aspects, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via the first modem 510), switch 570 may be switched to a first state that allows the first modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via the second modem 520), switch 570 may be switched to a second state that allows the second modem 520 to transmit signals according to the second RAT (e.g., via a transmit chain that includes transmit circuitry 544 and UL front end 572).

As described herein, the first modem 510 and/or the second modem 520 may include hardware and software components for implementing any of the various features and techniques described herein. The processors 512, 522 may be configured to implement part or all of the features described herein, e.g., by executing program instructions stored on a memory medium (e.g., a non-transitory computer-readable memory medium). Alternatively (or in addition), processors 512, 522 may be configured as a programmable hardware element, such as an FPGA (Field Programmable Gate Array), or as an ASIC (Application Specific Integrated Circuit). Alternatively (or in addition) the processors 512, 522, in conjunction with one or more of the other components 530, 532, 534, 540, 542, 544, 550, 570, 572, 335 and 336 may be configured to implement part or all of the features described herein.

In addition, as described herein, processors 512, 522 may include one or more processing elements. Thus, processors 512, 522 may include one or more integrated circuits (ICs) that are configured to perform the functions of processors 512, 522. In addition, each integrated circuit may include circuitry (e.g., first circuitry, second circuitry, etc.) configured to perform the functions of processors 512, 522.

In some aspects, the cellular communication circuitry 330 may include only one transmit/receive chain. For example, the cellular communication circuitry 330 may not include the modem 520, the RF front end 540, the DL front end 560, and/or the antenna 335b. As another example, the cellular communication circuitry 330 may not include the modem 510, the RF front end 530, the DL front end 550, and/or the antenna 335a. In some aspects, the cellular communication circuitry 330 may also not include the switch 570, and the RF front end 530 or the RF front end 540 may be in communication, e.g., directly, with the UL front end 572.

Example Network Element

Figure 6:
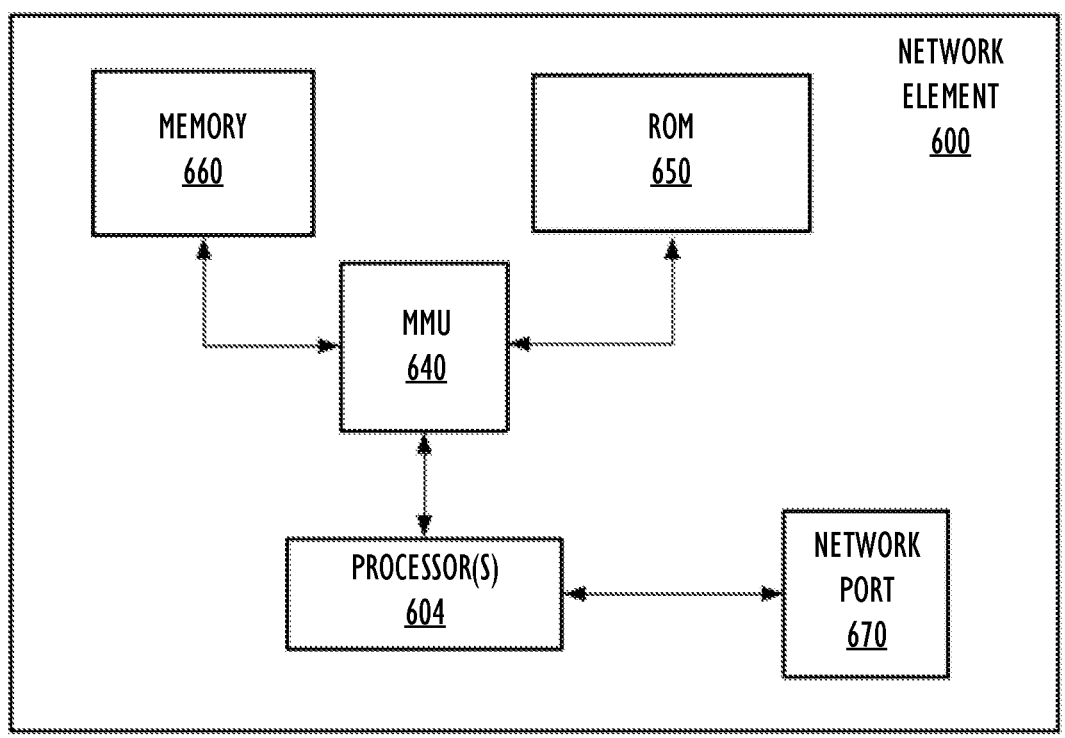
FIG. 6 illustrates an example block diagram of a network element, according to some aspects.

FIG. 6 illustrates an exemplary block diagram of a network element 600, according to some aspects. According to some aspects, the network element 600 may implement one or more logical functions/entities of a cellular core network, such as a mobility management entity (MME), serving gateway (S-GW), access and management function (AMF), session management function (SMF), network slice quota management (NSQM) function, etc. It is noted that the network element 600 of FIG. 6 is merely one example of a possible network element 600. As shown, the core network element 600 may include processor(s) 604 which may execute program instructions for the core network element 600. The processor(s) 604 may also be coupled to memory management unit (MMU) 640, which may be configured to receive addresses from the processor(s) 604 and translate those addresses to locations in memory (e.g., memory 660 and read only memory (ROM) 650) or to other circuits or devices.

The network element 600 may include at least one network port 670. The network port 670 may be configured to couple to one or more base stations and/or other cellular network entities and/or devices. The network element 600 may communicate with base stations (e.g., eNBs/gNBs) and/or other network entities/devices by means of any of various communication protocols and/or interfaces.

As described further subsequently herein, the network element 600 may include hardware and software components for implementing and/or supporting implementation of features described herein. The processor(s) 604 of the core network element 600 may be configured to implement or support implementation of part or all of the methods described herein, e.g., by executing program instructions stored on a memory medium (e.g., a nontransitory computer-readable memory medium). Alternatively, the processor 604 may be configured as a programmable hardware element, such as an FPGA (Field Programmable Gate Array), or as an ASIC (Application Specific Integrated Circuit), or a combination thereof.

5G NR Architecture with LTE

Figure 7A:
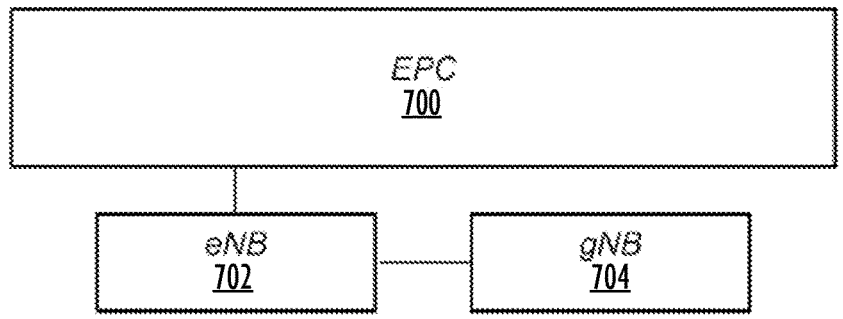
FIG. 7A illustrates an example of connections between an evolved packet core (EPC) network, an LTE base station (NB), and a 5G NR base station (gNB), according to some aspects.
Figure 7B:
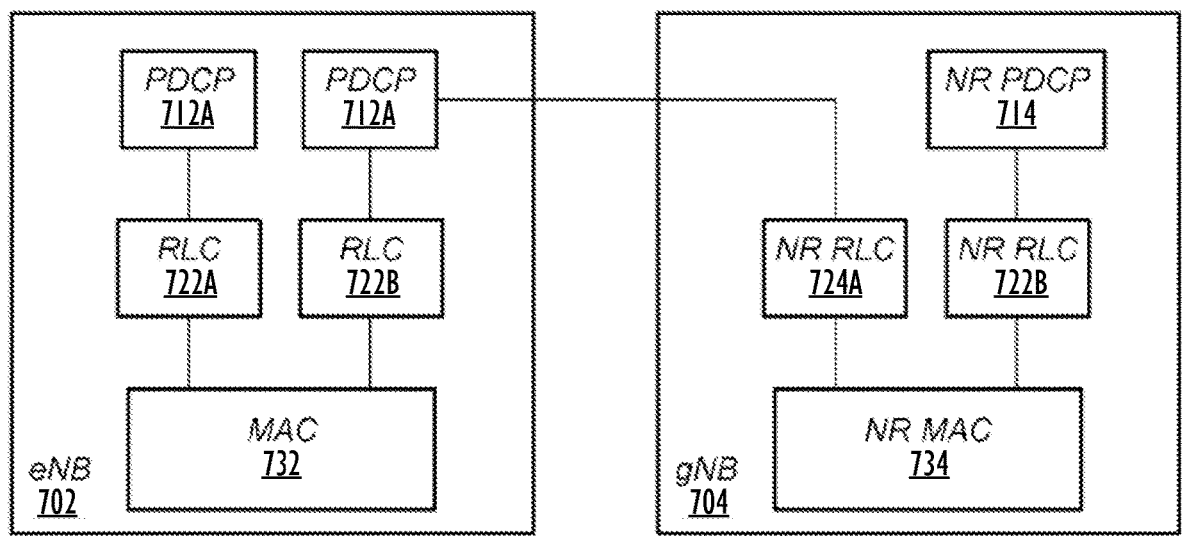
FIG. 7B illustrates an example of a protocol stack for an eNB and a gNB, according to some aspects.

In some implementations, fifth generation (5G) wireless communication will initially be deployed concurrently with current wireless communication standards (e.g., LTE). For example, dual connectivity between LTE and 5G new radio (5G NR or NR) has been specified as part of the initial deployment of NR. Thus, as illustrated in FIGS. 7A-B, evolved packet core (EPC) network 700 may continue to communicate with current LTE base stations (e.g., eNB 702). In addition, eNB 702 may be in communication with a 5G NR base station (e.g., base station 704) and may pass data between the EPC network 700 and base station 704. Thus, EPC network 700 may be used (or reused) and base station 704 may serve as extra capacity for UEs, e.g., for providing increased downlink throughput to UEs. In other words, LTE may be used for control plane signaling and NR may be used for user plane signaling. Thus, LTE may be used to establish connections to the network and NR may be used for data services.

FIG. 7B illustrates a proposed protocol stack for eNB 702 and base station 704. As shown, eNB 702 may include a medium access control (MAC) layer 732 that interfaces with radio link control (RLC) layers 722A-b. RLC layer 722A may also interface with packet data convergence protocol (PDCP) layer 712 a and RLC layer 722B may interface with PDCP layer 712B. Similar to dual connectivity as specified in LTE-Advanced Release 12, PDCP layer 712A may interface via a master cell group (MCG) bearer to EPC network 700 whereas PDCP layer 712B may interface via a split bearer with EPC network 700.

Additionally, as shown, base station 704 may include a MAC layer 734 that interfaces with RLC layers 724A-b. RLC layer 724A may interface with PDCP layer 712B of eNB 702 via an X2 interface for information exchange and/or coordination (e.g., scheduling of a UE) between eNB 702 and base station 704. In addition, RLC layer 724B may interface with PDCP layer 714. Similar to dual connectivity as specified in LTE-Advanced Release 12, PDCP layer 714 may interface with EPC network 700 via a secondary cell group (SCG) bearer. Thus, eNB 702 may be considered a master node (MeNB) while base station 704 may be considered a secondary node (SgNB). In some scenarios, a UE may be required to maintain a connection to both an MeNB and a SgNB. In such scenarios, the MeNB may be used to maintain a radio resource control (RRC) connection to an EPC while the SgNB may be used for capacity (e.g., additional downlink and/or uplink throughput).

5G Core Network Architecture—Interworking with Wi-Fi

Figure 8:
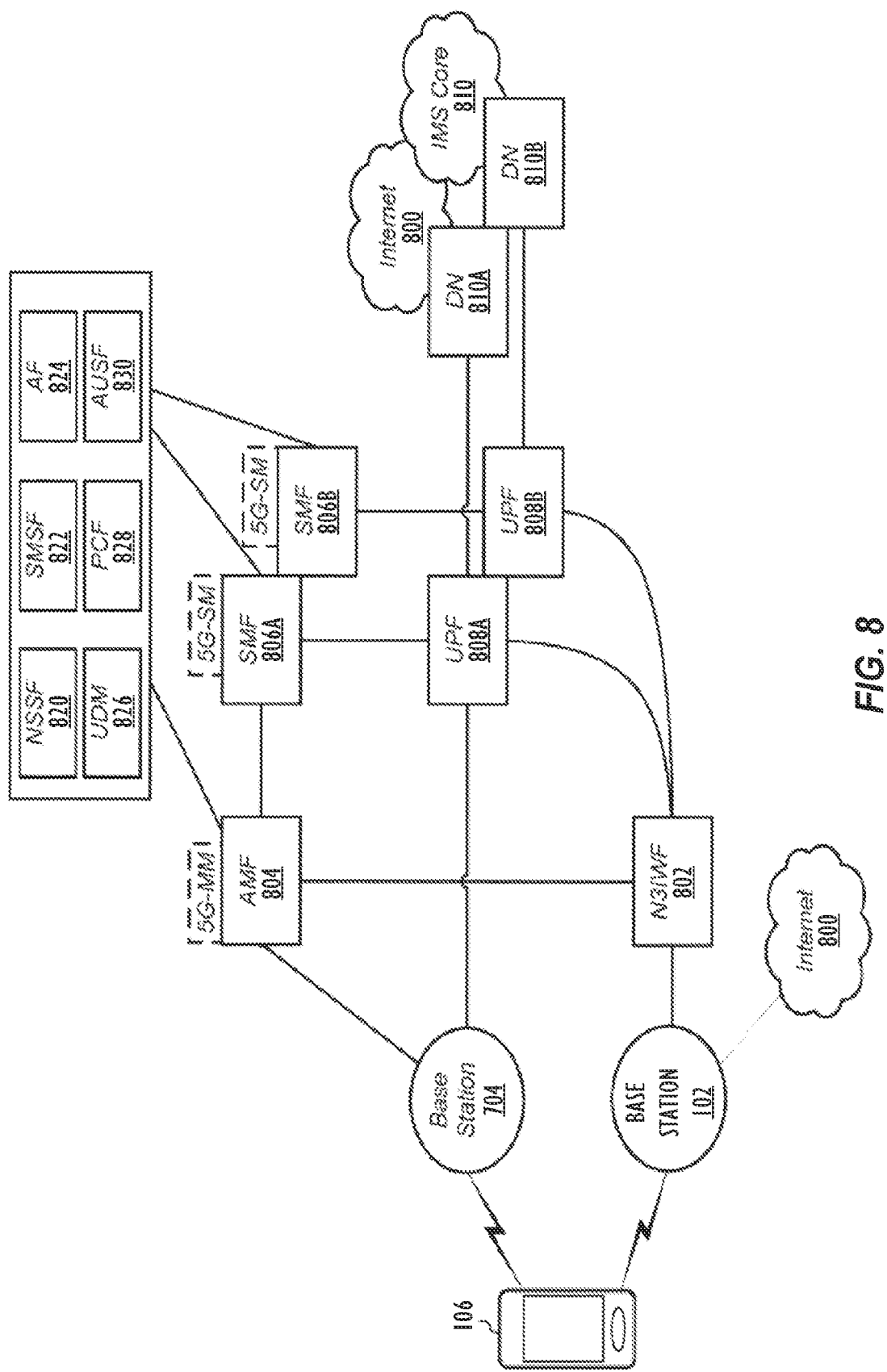
FIG. 8 illustrates an example of a 5G network architecture that incorporates both 3GPP (e.g., cellular) and non-3GPP (e.g., non-cellular) access to the 5G core network (CN), according to some aspects.

In some embodiments, the 5G core network (CN) may be accessed via (or through) a cellular connection/interface (e.g., via a 3GPP communication architecture/protocol) and a non-cellular connection/interface (e.g., a non-3GPP access architecture/protocol such as Wi-Fi connection). FIG. 8 illustrates an example of a 5G network architecture that incorporates both 3GPP (e.g., cellular) and non-3GPP (e.g., non-cellular) access to the 5G CN, according to some aspects. As shown, a user equipment device (e.g., such as UE 106) may access the 5G CN through both a radio access network (RAN, e.g., such as gNB or base station 804) and an access point, such as base station 102. The base station 102 may include a connection to the Internet 800 as well as a connection to a non-3GPP inter-working function (N3IWF) 802 network entity. The N3IWF may include a connection to a core access and mobility management function (AMF) 804 of the CN. The AMF 804 may include an instance of a 5G mobility management (5G MM) function associated with the UE 106. In addition, the RAN (e.g., base station 704) may also have a connection to the AMF 804. Thus, the 5G CN may support unified authentication over both connections as well as allow simultaneous registration for UE 107 access via both base station 704 and base station 102. As shown, the AMF 804 may include one or more functional entities associated with the 5G CN (e.g., network slice selection function (NSSF) 820, short message service function (SMSF) 822, application function (AF) 824, unified data management (UDM) 826, policy control function (PCF) 828, and/or authentication server function (AUSF) 830). Note that these functional entities may also be supported by a session management function (SMF) 806A and an SMF 806B of the 5G CN. The AMF 806 may be connected to (or in communication with) the SMF 806A. Further, the base station 704 may in communication with (or connected to) a user plane function (UPF) 808 a that may also be communication with the SMF 806A. Similarly, the N3IWF 802 may be communicating with a UPF 808 b that may also be communicating with the SMF 806B. Both UPFs may be communicating with the data network (e.g., DN 810 a and 810 b) and/or the Internet 800 and IMS core network 810.

Figure 9:
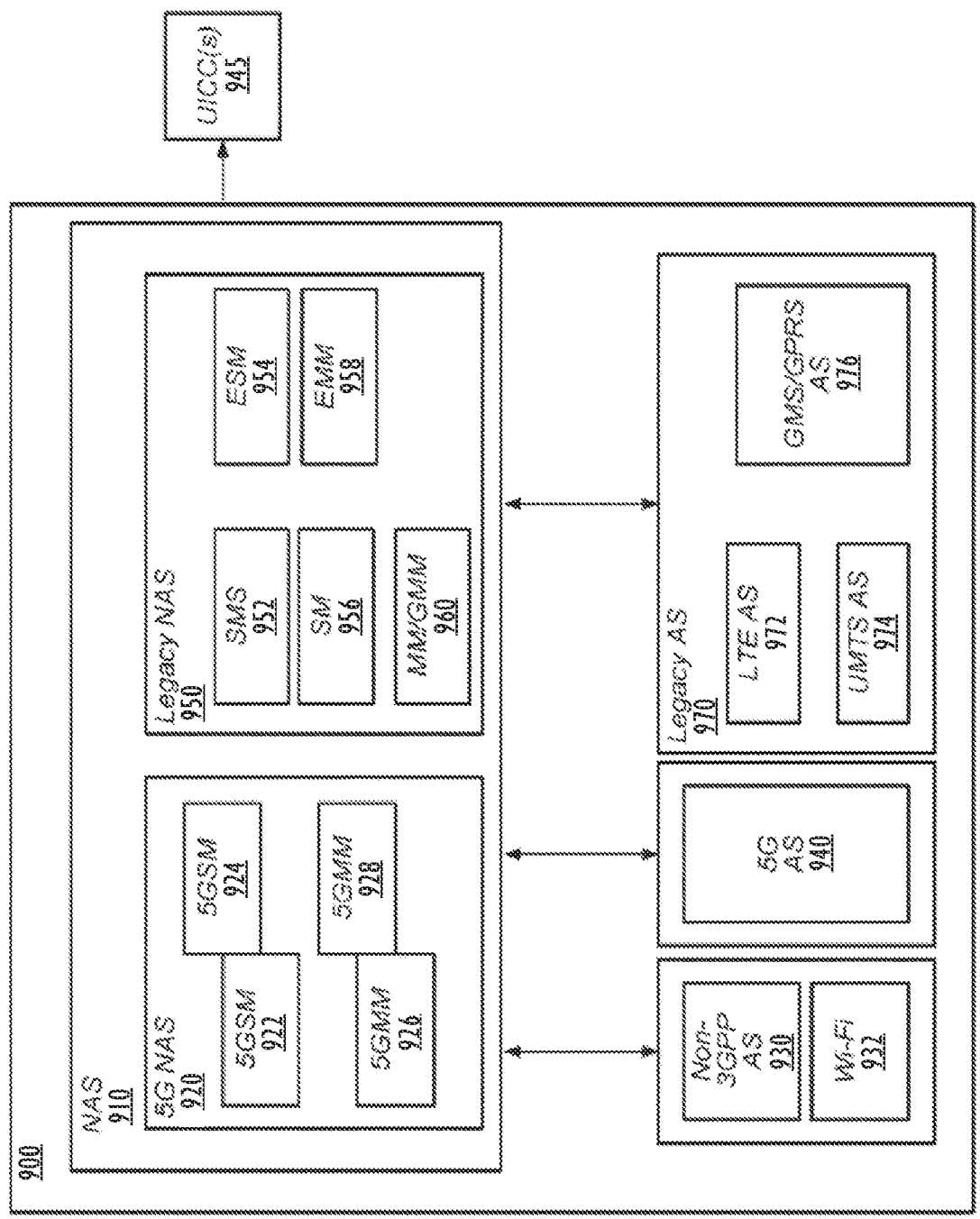
FIG. 9 illustrates an example of a baseband processor architecture for a wireless device, according to some aspects.

FIG. 9 illustrates an example of a baseband processor architecture for a UE (e.g., such as UE 106), according to some aspects. The baseband processor architecture 900 described in FIG. 9 may be implemented on one or more radios (e.g., radios 329 and/or 330 described above) or modems (e.g., modems 510 and/or 520) as described above. As shown, the non-access stratum (NAS) 910 may include a 5G NAS 920 and a legacy NAS 950. The legacy NAS 950 may include a communication connection with a legacy access stratum (AS) 970. The 5G NAS 920 may include communication connections with both a 5G AS 940 and a non-3GPP AS 930 and Wi-Fi AS 932. The 5G NAS 920 may include functional entities associated with both access stratums. Thus, the NAS 920 may include multiple 5G MM entities 926 and 928 and 5G session management (SM) entities 922 and 924. The legacy NAS 950 may include functional entities such as short message service (SMS) entity 952, evolved packet system (EPS) session management (ESM) entity 954, session management (SM) entity 956, EPS mobility management (EMM) entity 958, and mobility management (MM)/GPRS mobility management (GMM) entity 960. In addition, the legacy AS 970 may include functional entities such as LTE AS 972, UMTS AS 974, and/or GSM/GPRS AS 976.

Thus, the baseband processor architecture 900 allows for a common 5G-NAS for both 5G cellular and non-cellular (e.g., non-3GPP access). Note that as shown, the 5G MM may maintain individual connection management and registration management state machines for each connection. Additionally, a device (e.g., UE 106) may register to a single PLMN (e.g., 5G CN) using 5G cellular access as well as non-cellular access. Further, it may be possible for the device to be in a connected state in one access and an idle state in another access and vice versa. Finally, there may be common 5G-MM procedures (e.g., registration, de-registration, identification, authentication, as so forth) for both accesses.

Note that in various embodiments, one or more of the above described elements may be configured to perform methods to implement mechanisms for a multi-SIM capability signaling framework, e.g., as further described herein.

Wireless Device Attach/Registration

A communication device (e.g., wireless device or UE) may connect to one or more wireless elements through an attachment or registration process. For example, a wireless device connecting using an LTE communication standard may perform an attach procedure to connect to an eNB. Similarly, a wireless device connecting via a NR or 5G communication standard may perform a registration procedure to connect to a gNB. The attach/registration procedure of LTE and 5GNR are broadly similar. The wireless device may perform the registration/attach procedure when the wireless device initially attempts to connect to the wireless network, such as after being powered on, or when the appropriate radio is switched on, such as when airplane more is turned off. Initially, the wireless device may sense the physical medium for basic configuration and synchronization information related to the wireless node, such a time/frequency resources, root sequences, cyclic shifts, etc., which may be broadcast by the wireless network. The wireless device may then transmit an initial registration/attach request message to the wireless network, which may be referred to a msg1. Reception of msg1 by the wireless node may start a sequence of message exchanges between the wireless device and wireless node to connect the wireless device to the wireless network. This sequence of messages help set up aspects of the connection, such as RRC connection, physical layer channels, encoding and decoding information, assign resources, etc. In some wireless networks, such as 5G NR networks, the registration request process may be performed, during initial registration of the UE with the network, for a mobility registration update, or as part of a periodic registration update.

In some cases, a wireless connection between a wireless device and a wireless system may include multiple protocol layers. These layers may include an access stratus (AS) layer and a non-access stratum (NAS) layer. The AS layer controls the connection as between the wireless device and the wireless node. The AS layer includes radio link control (RLC), radio resource control (RRC) messaging, media access control (MAC), etc. The NAS layer may be used to for communications as between the wireless device and core network, such as the CN, MME, S-GW, AMF, etc.

Emergency Services Fallback

In some cases, 5G NR may be deployed without support for internet protocol (IP) multimedia subsystem (IMS) emergency bearers. The IMS CN provides voice-based services, such as voice over NR (VoNR) or voice over LTE (VoLTE). As an example of such a deployment, a 5G NR wireless network may be colocated with an LTE wireless network where the 5G NR wireless network is primarily configured for data traffic, while voice calls may be handled by the LTE wireless network. In such a case, if a wireless device connected to the 5G NR wireless network attempts to set up an emergency voice call towards the 5G core network (5GCN), the wireless device is redirected to the LTE wireless network to initiate the call.

Figure 10:
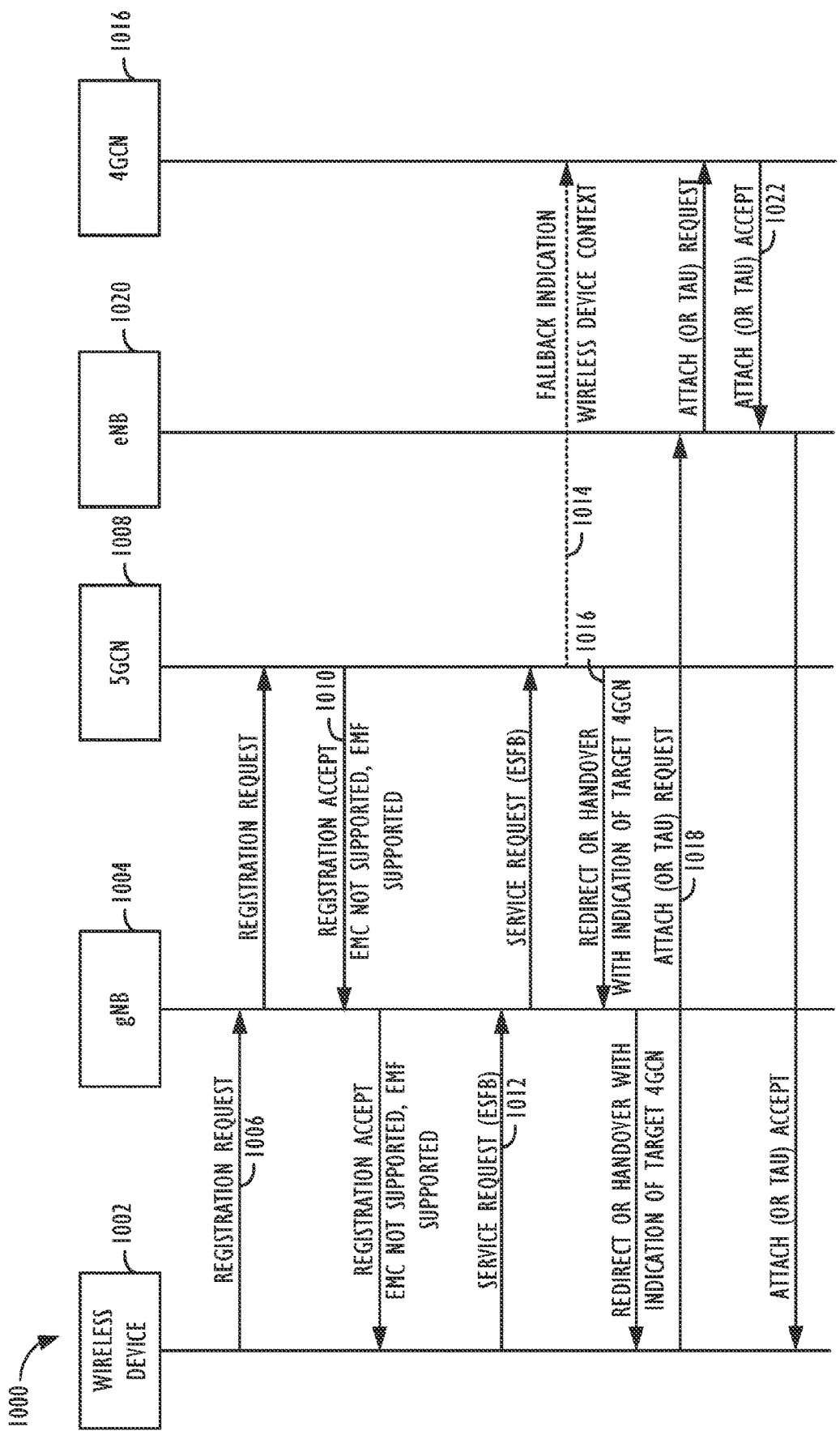
FIG. 10 is a message sequence diagram illustrating ESFB, in accordance with aspects of the present disclosure.

FIG. 10 is a message sequence diagram 1000 illustrating ESFB, in accordance with aspects of the present disclosure. In this example message sequence diagram 1000, a wireless device 1002 may initially connect to a wireless system, such as a 5G NR wireless system, after, for example, the wireless device is powered on, airplane mode may be turned off, and/or a wireless radio powered on, the wireless device comes within range of the wireless system, etc. In some cases, the wireless device may first sense the physical medium for basic configuration and/or synchronization information (not shown) and establish an RRC connection with a gNB 1004. Once the RRC connection is established, the wireless device may transmit an RRC connection setup complete message along with a registration request 1006 to the 5GCN 1008 via the gNB 1004 to establish the AS connection with the 5GCN 1008. The 5GCN 1008 may respond to the registration request 1006 with a registration accept message 1010 sent to the wireless device 1002 via the gNB 1004. The registration accept message 1010 may include an indication that an emergency services fallback indicator (EMF) is supported. The registration accept message 1010 may also include an indication that the emergency service bearer services indication (EMC) is not supported.

Of note, there may be multiple messages exchanged as between the wireless device 1002 and the gNB 1004 between the registration request 1006 and registration accept message 1010 that may be omitted in this discussion for clarity.

In cases where EMF is supported and EMC is not supported, if the user of the wireless device 1002 initiates an emergency call, the wireless device 1002 may transmit an ESFB service request 1012 to the 5GCN 1008 via the gNB 1004. In some cases, the 5GCN 1008 may send an indication 1014 to a target CN, such as an LTE CN (4GCN) 1016 whether inter-RAT fallback or inter-system fallback is expected to be performed. In some cases, the indication 1014 may include a wireless device context. The 5GCN 1008 may respond to the ESFB service request 1012 by redirecting the wireless device 1002 to the target 4GCN 1016. In this example, the 5GCN 1008 may send a redirection indication 1016, such as an RRC release message including redirection information, such as an indication of the target 4GCN. The wireless device 1002 may then transmit attach request 1018 to the target 4GCN 1016 via eNB 1020, and receive an attach accept message 1022 in response. In some cases, the transmit attach request 1018 may be a tracking area update (TAU) request. The wireless device 1002 may then set up an emergency call on the LTE system.

Figure 11:
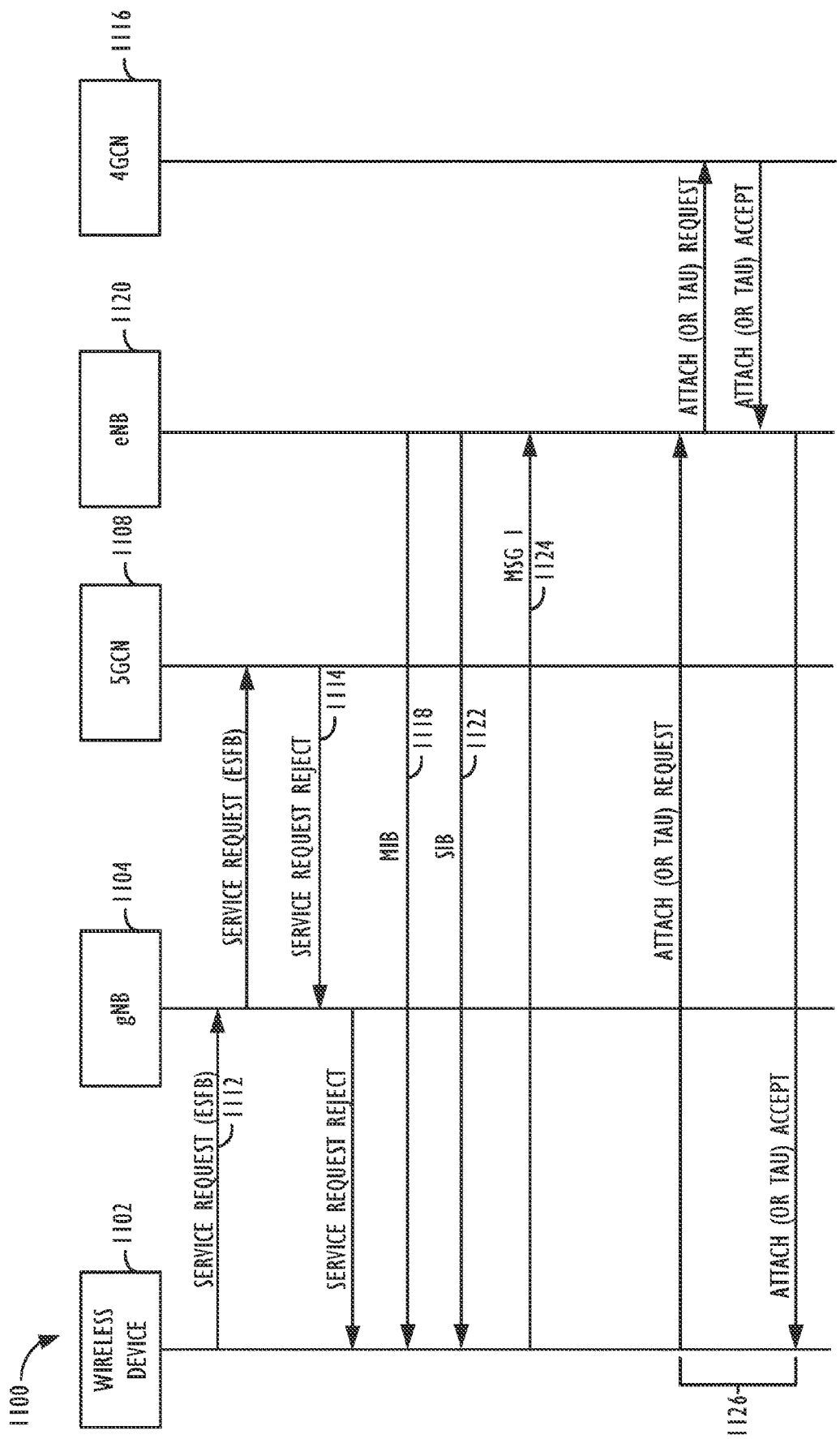
FIG. 11 is a message sequence diagram illustrating ESFB failures, in accordance with aspects of the present disclosure.

FIG. 11 is a message sequence diagram 1100 illustrating ESFB failures, in accordance with aspects of the present disclosure. Initially, the wireless device may have already established a connection with a wireless network, such as a 5G NR wireless system, as discussed above with respect to FIG. 10. Also as discussed above, the 5G NR wireless system may support EMF, but not EMC. In some cases, the ESFB procedure may unexpectedly fail or the EFSB service request 1112 may be unexpectedly rejected. For example, in response to the EFSB service request 1112 sent to the 5GCN 1108 via gNB 1104 by wireless device 1102, the 5GCN 1108 may response with a service request reject message 1114 such as a tracking area not allowed error, roaming not allowed in tracking area error, congestion error, a N1 mode not allowed error, or a restricted service area error.

In some cases, relatively abnormal cases, the EFSB service request 1012 may fail with a T3517 service request timer expiry error, an access barred error, lower layer failure, and/or a congestion error is received without an associated T3346 back-off timer value. In some cases, the error may be determined by a wireless device without an explicit error message from the wireless network (e.g., service request reject 1114 is never sent or is not received by the wireless device). For example, if a response is not received to the EFSB service request 1112 before the expiration of the T3517 service request timer, the wireless device may determine that a T3517 service request timer expiry error has occurred. As another example, the wireless device may determine that an access barred error or lower layer failure error has occurred if certain messages are not received by the wireless device from the wireless network and the service request reject 1114 is not received. Additionally, in some cases, the wireless device 1102 may receive an unexpected partial response. For example, rather than a service request reject message 1114, the wireless device 1102 may receive a redirection indication, as described in FIG. 10, without the indication of the target wireless system, such as 4GCN 1216.

In the above described cases, the wireless device 1102 may not receive a redirection indication directing the wireless device 1102 to a fallback emergency wireless network, which could cause the emergency call to either fail or be delayed. Rather than retrying, continuing to wait, etc., with the 5G NR wireless network the wireless device 1102 may, after receiving the service request rejected message 1114, begin attempting to select a new wireless system, such as an LTE wireless system. Selecting the LTE wireless system may be performed in a manner consistent with emergency call establishment in such a system. In some cases, the wireless device 1102 may select other types of wireless systems. For example, the wireless device 1102 may select a 3G, HSPA, or other wireless system.

In this example, the wireless device 1102 may sense the physical medium for basic configuration and/or synchronization information for an LTE based wireless network. For example, in LTE, the wireless device may tune to certain radio frequencies, search for a master information block (MIB) 1118 and system information blocks (SIBs) 1122 transmitted by an eNB 1120, decode the received blocks, generate a msg1 1124 based on the received blocks, and transmit the msg1 1124 to the eNB 1120 to begin an initial attach procedure 1126 (or TAU) with the LTE wireless network to establish an AS connection with the 4GCN 1116.

Figure 12:
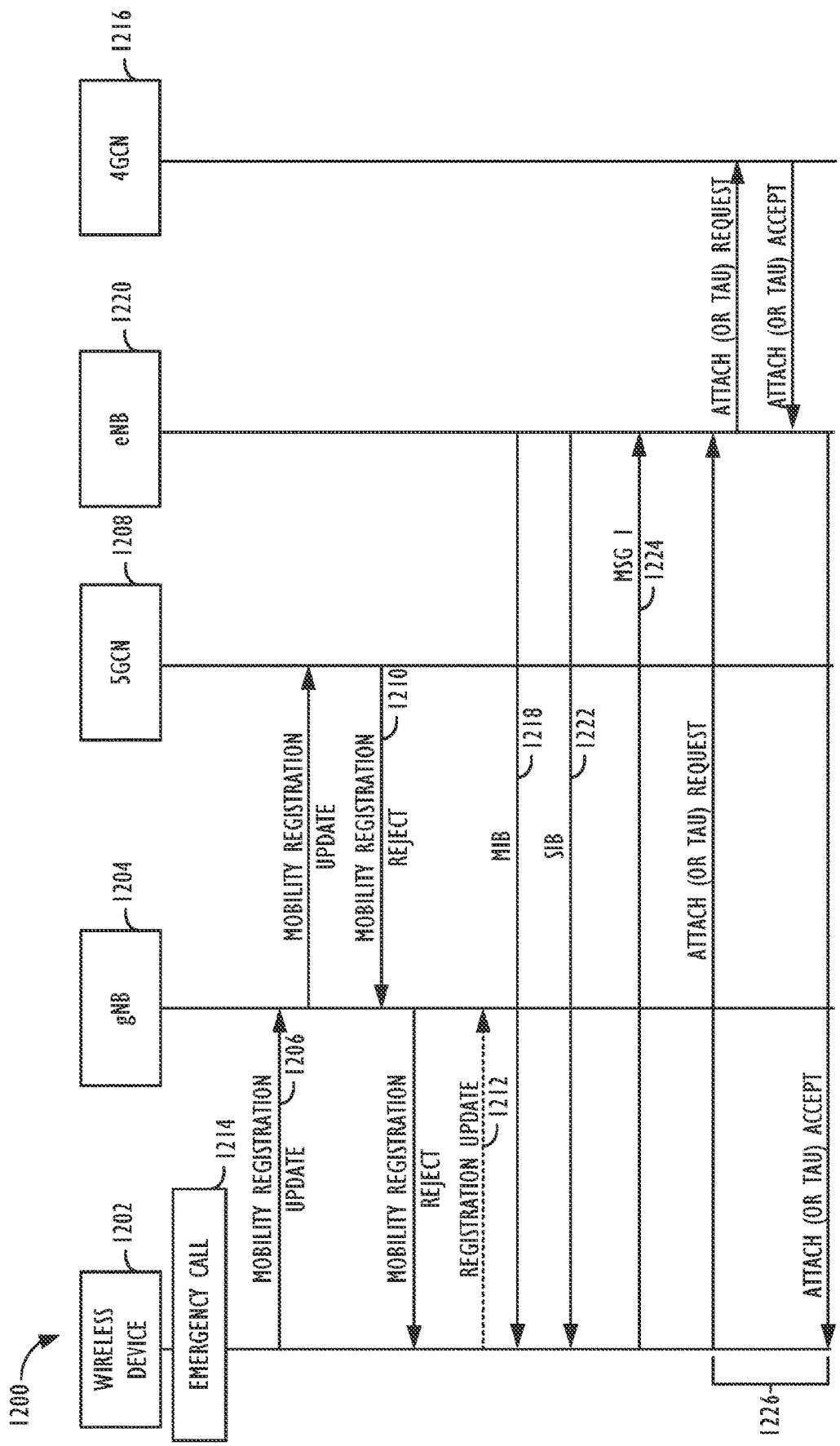
FIG. 12 is a message sequence diagram illustrating ESFB failure during a registration update, in accordance with aspects of the present disclosure.

FIG. 12 is a message sequence diagram 1200 illustrating ESFB failure during a registration update, in accordance with aspects of the present disclosure. In some cases, a wireless device 1202 may perform registration updates when connected to a 5G NR wireless system. For example, the wireless device 1202 may perform periodic registration updates based on a schedule, or mobility registration updates based on movement of the wireless device 1202, such as if the wireless device 1202 moves into a new tracking area. In some cases, as shown in FIG. 12, an emergency call may trigger the mobility registration update 1206. In this example, the wireless device 1202 may be connected to a 5GCN 1208 via gNB 1204. The 5G NR wireless system may support EMF, but not EMC. If the user attempts to place an emergency call 1214, the wireless device 1202 may transmit a mobility registration update message 1206 and receive a mobility registration reject message 1210 from the 5GCN 1208 in response. In some cases where the registration update fails, the wireless device may attempt to update the registration and send a registration update message 1212. However, performing a registration update may delay or cause the emergency call to drop. Rather than performing the registration update, the wireless device 1202 may, after receiving the mobility registration reject message 1210, begin attempting to select a new wireless system, such as an LTE wireless system.

Selecting the LTE wireless system may be performed in a manner consistent with emergency call establishment in such a system, such as that described above with respect to FIG. 11. In some cases, the wireless device 1202 may select other types of wireless systems. For example, the wireless device 1202 may select a 3G, HSPA, or other wireless system.

In this example, the wireless device 1202 may sense the physical medium for basic configuration and/or synchronization information for an LTE based wireless network, search for a master information block (MIB) 1218 and system information blocks (SIBs) 1222 transmitted by an eNB 1220, decode the received blocks, generate a msg1 1224 based on the received blocks, and transmit the msg1 1224 to the eNB 1220 to begin an initial attach procedure 1226 (or TAU procedure) with the LTE wireless network to establish an AS connection with the 4GCN 1216.

In some cases, mobility registration may in process, and if the user attempts to place an emergency call 1214 while the registration is being updated, the emergency call may be delayed or dropped if a mobility registration reject 1210 message is received and the wireless device attempts to send the registration update message 1212. Instead, the wireless device 1202 may, after determining that the user is attempting to place an emergency call 1214 and receiving the mobility registration reject 1210, begin attempting to select a new wireless system, such as an LTE wireless system.

Similarly, if the wireless device 1202 is attempting to perform a mobility registration update, after sending the mobility registration update 1206, the wireless device 1202 may start a T3346 timer for receiving a response to the mobility registration update 1206. If a user attempts to place an emergency call 1214 prior to the expiration of the T3346 timer (e.g., the response to the mobility registration update 1206 has not been received), the wireless device 1202 may be redirected to another wireless network, such as the LTE wireless network, and perform an attach (or TAU) procedure with the LTE wireless network while the T3346 timer is running. Alternatively, the T3346 timer may be expired if the wireless device 1202 attempts to attach (or performs a TAU) to another wireless network as a part of ESFB.

Similarly, if a user attempts to place an emergency call and an error internal to the wireless device is detected, such as if an expected message is not is received from the first wireless network, there is a lower layer failure on the wireless device, etc., the wireless device 1202 may attempt to select a new wireless network. For example, if the wireless device 1202 is attempting to perform a mobility registration update, after sending the mobility registration update 1206, the wireless device 1202 may start a T3510 timer for receiving a response to the mobility registration update 1206. If the T3510 timer expires, the wireless device 1202 did not receive, for example, the mobility registration reject 1210 form the wireless network. If a user attempts to place an emergency call 1214 and the T3510 timer expires or is expired, the wireless device 1202 may attempt to select a new wireless network.

User Cancelled Call

Where the wireless system is configured to redirect voice calls to another wireless system, such as in a 5G NR system which supports EMF, but not EMC, and evolved packet system (EPS) fallback, if a user initiates a call, but later cancels the call before the call is complete, it may not be clear which wireless system the wireless device should be connected to.

Figure 13:
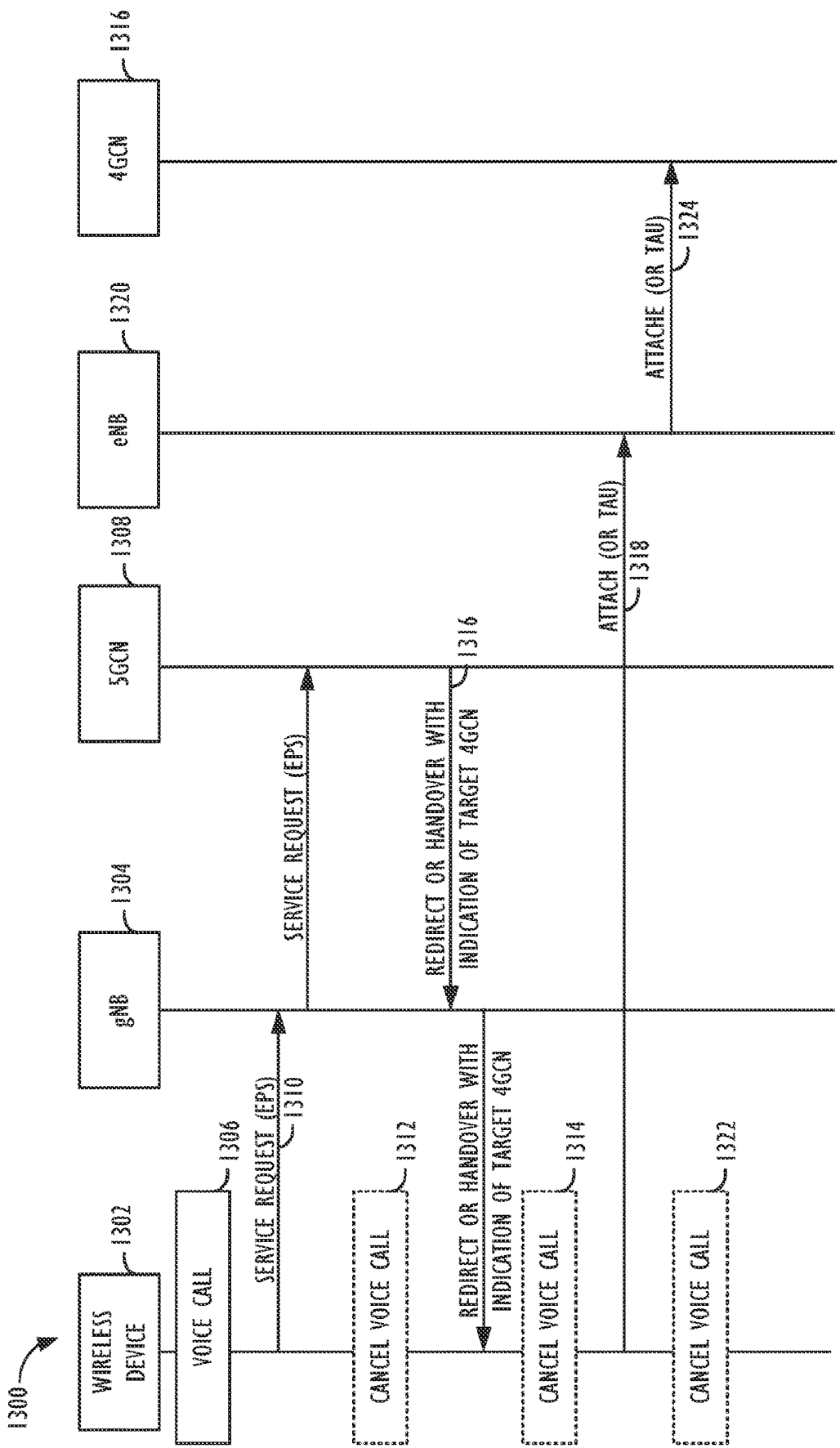
FIG. 13 is a message sequence diagram illustrating user cancellation during ESFB, in accordance with aspects of the present disclosure.

FIG. 13 is a message sequence diagram 1300 illustrating user cancellation during EPS fallback, in accordance with aspects of the present disclosure. Initially, the wireless device 1302 may be connected via a gNB 1304 to a 5GCN 1308. A user initiated voice call 1306 may be triggered and the wireless device 1302 may send an service request 1310 to the 5GCN 1308 via the gNB 1304. In some cases, the user may then attempt to cancel 1312 the call. In such cases, the wireless device 1302 may know that the user is attempting to cancel the call, but the wireless network does not know that the user is attempting to cancel the call and is still trying to set up the fallback. In such cases where the user has cancelled the call before connection has been released by the network (such as in redirection (e.g., handover) indication 1316), the wireless device 1302 may receive the redirection (e.g. indication 1316 after the user cancels the call and may ignore the redirection indication 1316. The wireless device 1302 may then just stay camped on the 5G wireless system. In some cases, the call may be an emergency call and cancellation during an ESFB procedure may be handled in a substantially similar way to the EPS fallback procedure.

In another case where the user does not attempt to cancel the call before connection has been released by the network, the wireless device 1302 may receive the redirection indication 1316. The wireless device 1302 may then receive an indication to cancel the call 1314 from the user while the wireless device 1302 is attempting to connect (but not yet connected) to the target wireless system. In such cases, the wireless device 1302 may then stop attempting to connect to the target wireless system and reconnect to the 5G wireless system.

In another case, the wireless device 1302 may be attached to the target wireless network, such as an LTE wireless system via eNB 1320 and 4GCN 1316, and the wireless device 1302 may receive an indication to cancel the call 1322 from the user while a TAU procedure 1324, or attach procedure is being performed by the wireless network. In such cases, the wireless device 1302 may finish the registration procedure with the target wireless network and after the registration procedure is complete, the wireless device 1302 may attempt to reconnect to the 5G wireless system.

Figure 14:
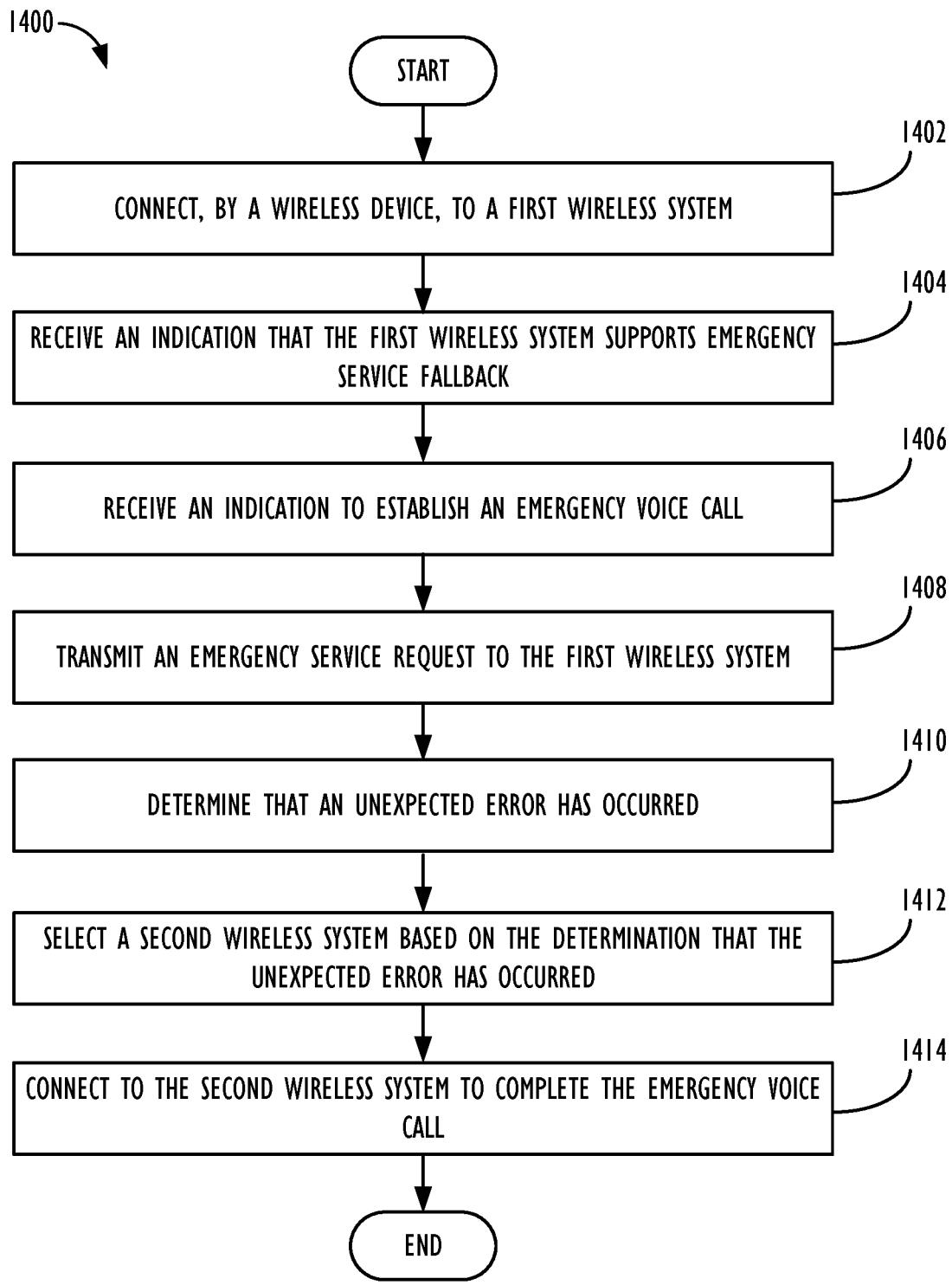
FIG. 14 is a flowchart illustrating a technique for establishing a voice call, in accordance with aspects of the present disclosure.

FIG. 14 is a flowchart 1400 illustrating a technique for establishing a voice call, in accordance with aspects of the present disclosure. At block 1402, a wireless device connects to a first wireless system. For example, a wireless device may establish a connection with a 5G NR wireless system. At block 1404, an indication that the first wireless system supports emergency service fallback is received. For example, a registration accept message may include an indication that an emergency services fallback indicator is supported by the wireless system. At block 1406, an indication to establish an emergency voice call may be received. For example, the wireless device may receive user input to initiate an emergency voice call. At block 1408, an emergency service request may be transmitted to the first wireless system. For example, the wireless device may transmit an ESFB service request to the wireless system.

At block 1410, a determination may be made that an unexpected error has occurred. For example, determining the unexpected error has occurred may include receiving a service request rejected for the emergency service request. The received service request reject message may result in one of a tracking area not allowed, roaming not allowed, congestion, N1 mode not allowed, restricted service area, T3517 expiry, access barred, lower layer failure error message on the wireless device. For example, the device may determine that service request reject message indicates that a tracking area not allowed error, roaming not allowed in tracking area error, congestion error, a N1 mode not allowed error, or a restricted service area error has occurred. In another example, the wireless device may determine that wireless network has not responded and a T3517 service request timer expiry error has occurred, or that no response was received due to an access barred error or lower layer failure. In another example, a congestion error may be received in the service request reject message without an associated T3346 back-off timer or a redirection (e.g., handover) indication may be received without an indication of a target wireless system. As another example, determining the unexpected error has occurred includes receiving a radio resource control (RRC) release message in response to the emergency service request, and determining that the RRC release message does not include redirection (e.g., handover) information. In another example, the wireless device may also transmit a registration update request and determining the unexpected error has occurred includes receiving a registration update rejection. In another example, the wireless device may also transmit a registration update request and wherein the determining the unexpected error has occurred comprises determining, by the wireless device, an expected message from the first wireless network has not been received. In another example, determining the unexpected error has occurred comprises determining that a network congestion timer is running.

At block 1412, a second wireless system may be selected based on the determination that the unexpected error has occurred. For example, in response to determining that the unexpected has occurred, the wireless device may attempt to select another wireless network to complete the emergency call. At block 1414, a connection to the second wireless system to complete the emergency voice call may be established. For example, the wireless device may perform an attach (or TAU) and registration procedure with an LTE wireless system, or other wireless system coupled to a circuit switched voice network, to connect to the LTE wireless system and complete the emergency call.

Figure 15:
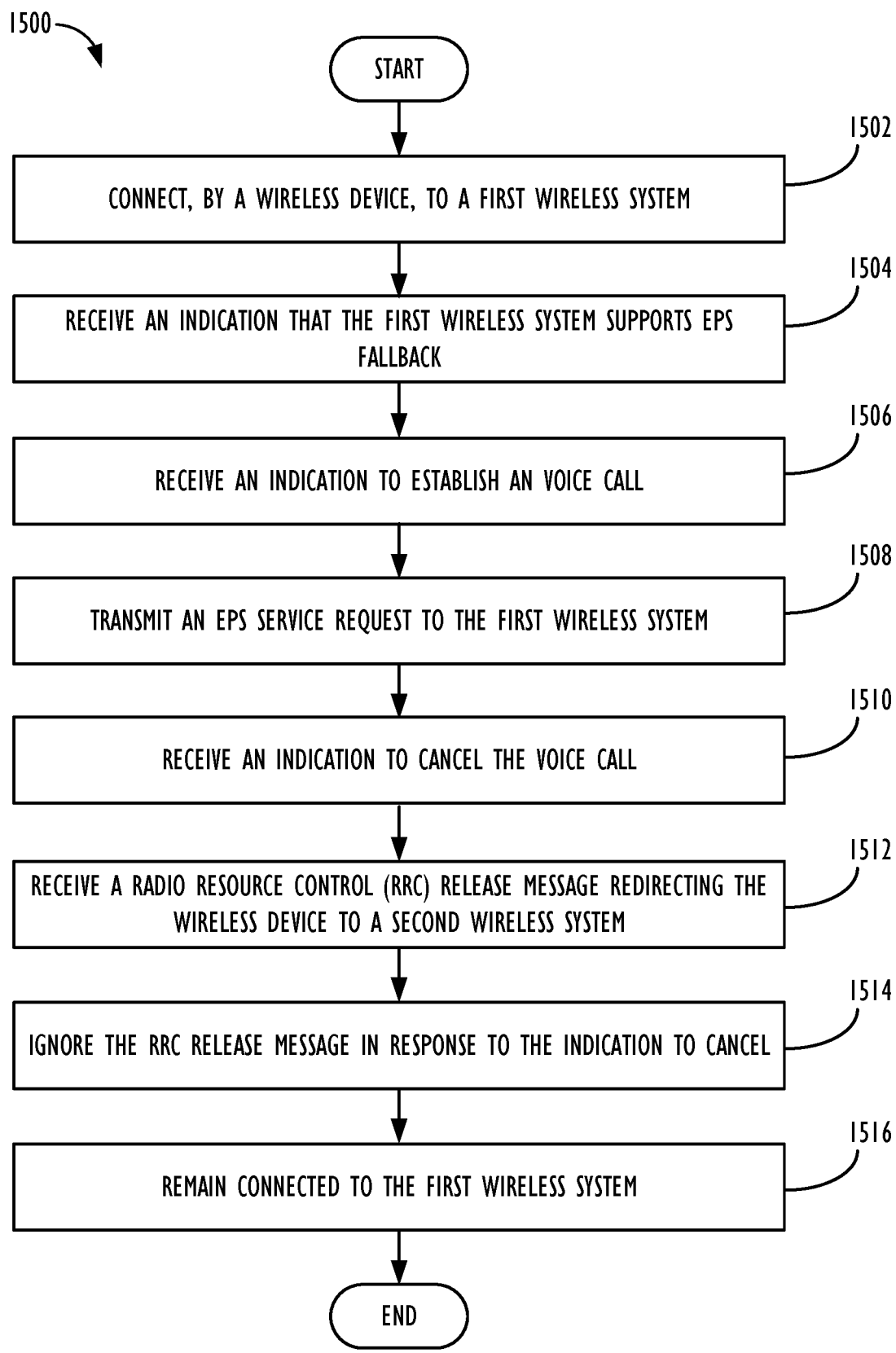
FIG. 15 is a flowchart illustrating a technique for cancelling a call, in accordance with aspects of the present disclosure.

FIG. 15 is a flowchart 1500 illustrating a technique for cancelling a call, in accordance with aspects of the present disclosure. At block 1502, connecting, by a wireless device, to a first wireless system. For example, a wireless device may establish a connection with a 5G NR wireless system. At block 1504, an indication that the first wireless system supports EPS fallback is received. For example, a registration accept message may include an indication that an EPS indicator is supported by the wireless system. At block 1506, an indication to establish a voice call may be received. For example, the wireless device may receive user input to initiate a voice call. At block 1508, a service request may be transmitted to the first wireless system. For example, the wireless device may transmit an EPS service request to the wireless system. At block 1510, an indication to cancel the voice call may be received. For example, the wireless device may receive user input to cancel the voice call. At block 1512, a radio resource control (RRC) release message redirecting the wireless device to a second wireless system may be received. For example, the 5G wireless system may respond to the services request with an RRC release message including an indication of a target wireless system for the wireless device to connect to. At block 1514, the wireless device may ignore the RRC release message in response to the indication to cancel. At block 1516, the wireless device may remain connected to the first wireless system. In some cases, the voice call may be an emergency voice call.

Figure 16:
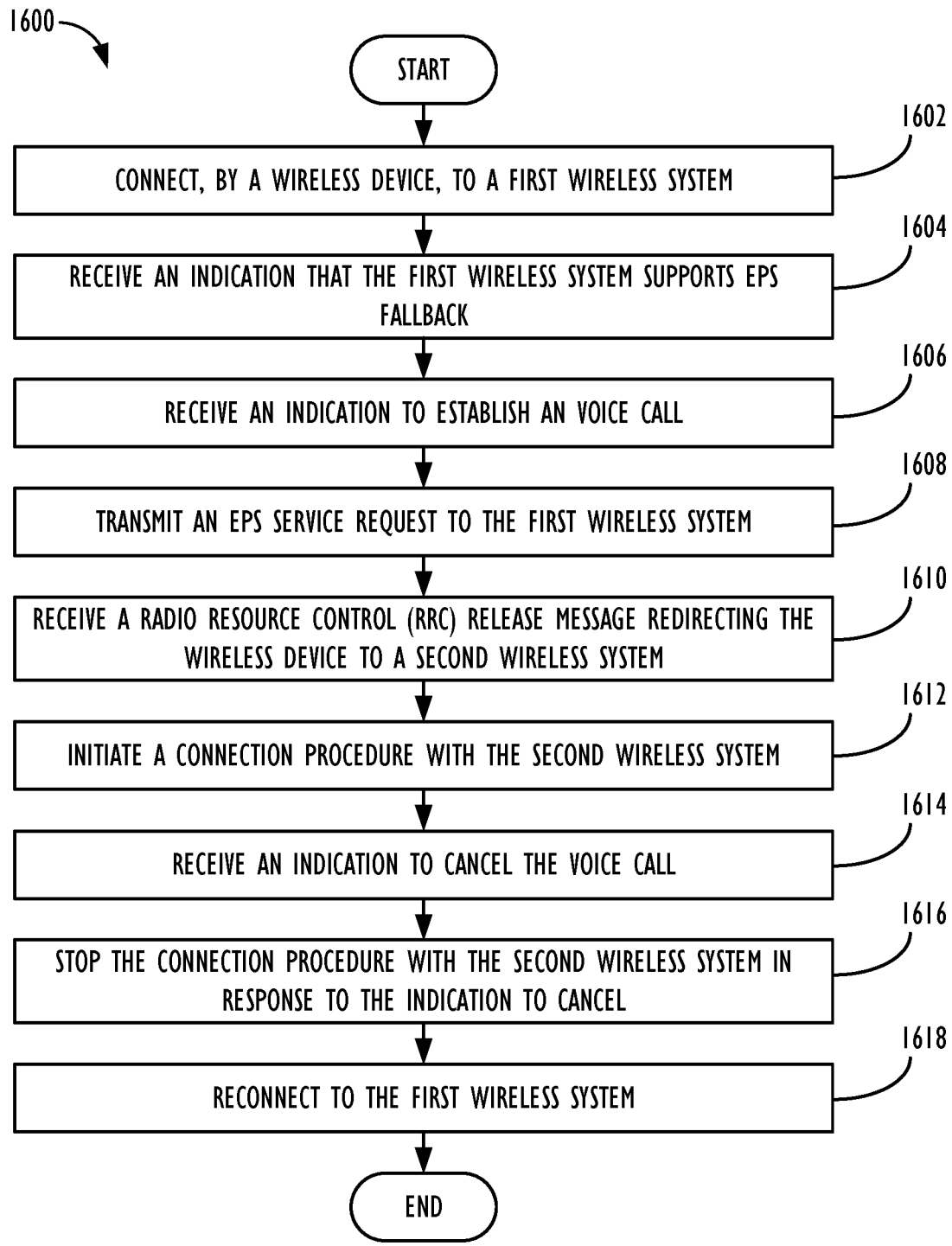
FIG. 16 is a flowchart illustrating a technique for cancelling a call, in accordance with aspects of the present disclosure.
Figure 17:
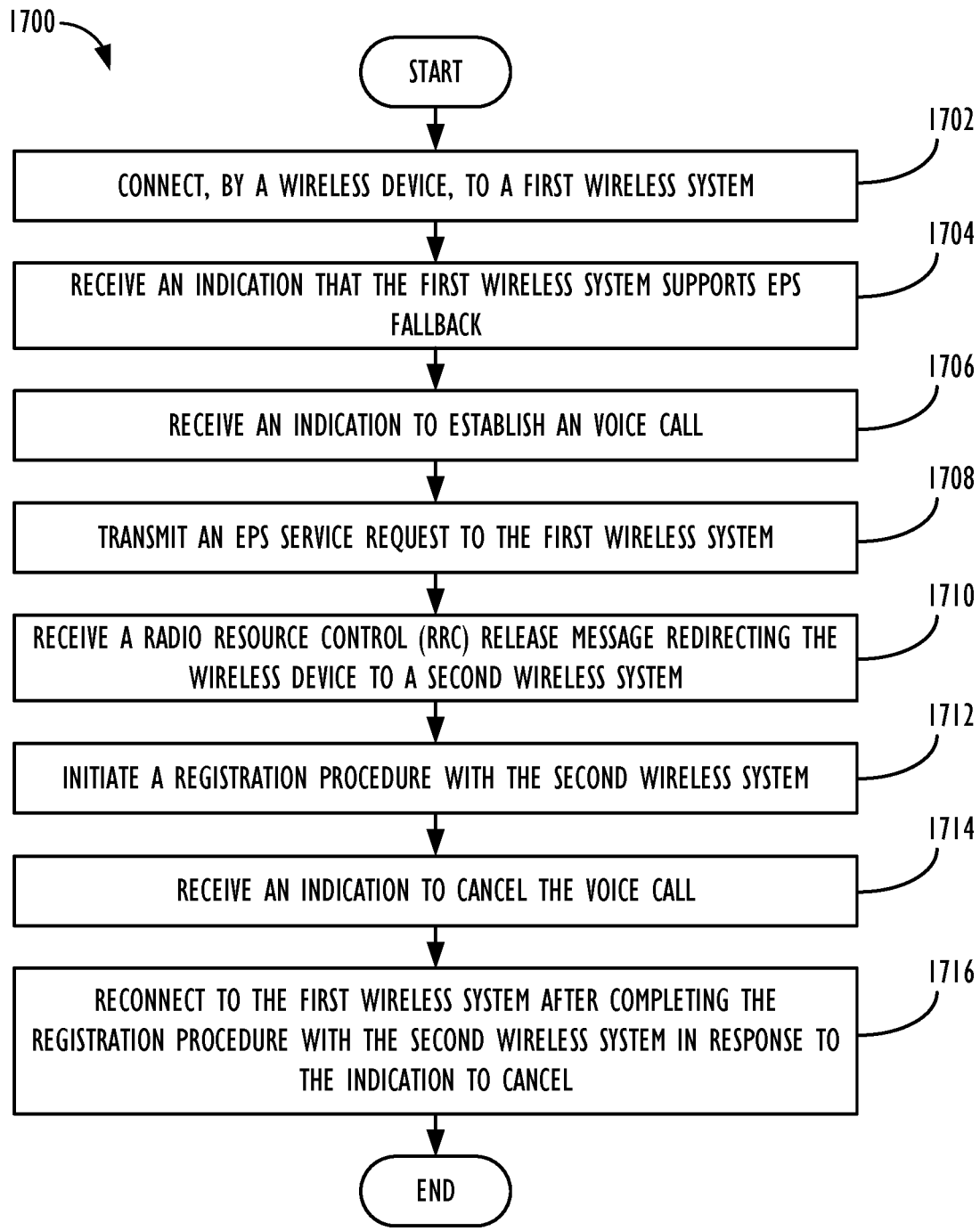
FIG. 17 is a flowchart illustrating a technique for cancelling a call, in accordance with aspects of the present disclosure.

FIG. 16 is a flowchart 1600 illustrating a technique for cancelling a call, in accordance with aspects of the present disclosure. At block 1602, connecting, by a wireless device, to a first wireless system. For example, a wireless device may establish a connection with a 5G NR wireless system. At block 1604, an indication that the first wireless system supports EPS fallback is received. For example, a registration accept message may include an indication that an EPS fallback indicator is supported by the wireless system. At block 1606, an indication to establish a voice call may be received. For example, the wireless device may receive user input to initiate a voice call. At block 1608, a service request may be transmitted to the first wireless system. For example, the wireless device may transmit an EPS service request to the wireless system. At block 1610, a radio resource control (RRC) release message redirecting the wireless device to a second wireless system may be received. For example, the 5G wireless system may respond to the services request with an RRC release message including an indication of a target wireless system for the wireless device to connect to. At block 1612, a connection procedure may be initiated with the second wireless system. For example, the wireless device may begin an attachment procedure (or TAU) with an LTE wireless system. At block 1614, an indication to cancel the voice call may be received. For example, the wireless device may receive user input to cancel the voice call. At block 1616, the wireless device may stop the connection procedure with the second wireless system in response to the indication to cancel. For example, the wireless device may stop responding to or transmitting messages that are a part of the attachment (or TAU) procedure with the LTE wireless system. At block 1618, the wireless device may reconnect to the first wireless system. For example, the wireless device may reestablish the connection with the 5G wireless system. In some cases, the voice call may be an emergency voice call FIG. 17 is a flowchart 1700 illustrating a technique for cancelling a call, in accordance with aspects of the present disclosure. At block 1702, connecting, by a wireless device, to a first wireless system. For example, a wireless device may establish a connection with a 5G NR wireless system. At block 1704, an indication that the first wireless system supports EPS fallback is received. For example, a registration accept message may include an indication that an EPS indicator is supported by the wireless system. At block 1706, an indication to establish a voice call may be received. For example, the wireless device may receive user input to initiate a voice call. At block 1708, a service request may be transmitted to the first wireless system. For example, the wireless device may transmit an EPS service request to the wireless system. At block 1710, a radio resource control (RRC) release message redirecting the wireless device to a second wireless system may be received. For example, the 5G wireless system may respond to the services request with an RRC release message including an indication of a target wireless system for the wireless device to connect to. At block 1712, a registration procedure may be initiated with the second wireless system. For example, the wireless device after performing an attachment procedure and camping on the LTE wireless system may be performing a registration procedure, such as transmitting a registration request, waiting for lower layers to perform resection, tracking area updates, etc. At block 1714, an indication to cancel the voice call may be received. For example, the wireless device may receive user input to cancel the voice call. At block 1716, the wireless device may reconnect to the first wireless system after completing the registration procedure with the second wireless system in response to the indication to cancel. For example, right after the registration procedure is completed, the wireless device may move back to the 5G wireless system. In some cases, the voice call may be an emergency voice call

EXAMPLES

In the following sections, further exemplary aspects are provided.

According to Example 1, a method for establishing a voice call, the method comprising: connecting, by a wireless device, to a first wireless system; receiving an indication that the first wireless system supports emergency service fallback; receiving an indication to establish an emergency voice call; transmitting an emergency service request to the first wireless system; determining that an unexpected error has occurred; selecting a second wireless system based on the determination that the unexpected error has occurred; and connecting to the second wireless system to complete the emergency voice call.

Example 2 comprises the subject matter of example 1, wherein determining the unexpected error has occurred comprises receiving a service request rejected message for the emergency service request.

Example 3 comprises the subject matter of example 2, wherein the received service request reject message results in at least one of a tracking area not allowed, roaming not allowed, congestion, N1 mode not allowed, restricted service area, error message on the wireless device.

Example 4 comprises the subject matter of example 1, wherein determining the unexpected error has occurred comprises: determining, by the wireless device, an expected message from the first wireless network has not been received; and determining that at least one of a T3517 expiry, access barred, or lower layer failure has occurred.

Example 5 comprises the subject matter of example 1, wherein the determining the unexpected error has occurred comprises: receiving a radio resource control (RRC) release message in response to the emergency service request; and determining that the RRC release message does not include redirection information.

Example 6 comprises the subject matter of example 1, further comprising transmitting a registration update request, and wherein the determining the unexpected error has occurred comprises receiving a registration update rejection.

Example 7 comprises the subject matter of example 1, further comprising transmitting a registration update request and wherein the determining the unexpected error has occurred comprises determining, by the wireless device, an expected message from the first wireless network has not been received.

Example 8 comprises the subject matter of example 1, wherein the determining the unexpected error has occurred comprises determining that a network congestion timer is running.

Example 9 comprises the subject matter of example 1, wherein the first wireless system comprises a 5G new radio wireless system.

Example 10 comprises the subject matter of example 1, wherein the second wireless system comprises a 4G long term evolution wireless system.

Example 11 comprises the subject matter of example 1, wherein the second wireless system comprises a wireless system coupled to a circuit switched voice network.

According to Example 12, a method for cancelling a call, the method comprising: connecting, by a wireless device, to a first wireless system; receiving an indication that the first wireless system supports evolved packet system (EPS)fallback; receiving an indication to establish a voice call; transmitting a service request to the first wireless system; receiving an indication to cancel the voice call; receiving a radio resource control (RRC) release message redirecting the wireless device to a second wireless system; ignoring the RRC release message in response to the indication to cancel; and remaining connected to the first wireless system.

Example 13 comprises the subject matter of example 12, wherein the voice call comprises an emergency voice call and further comprising receiving an indication that the first wireless system supports emergency service fallback.

According to Example 14, a method for cancelling a call, the method comprising: connecting, by a wireless device, to a first wireless system; receiving an indication that the first wireless system supports evolved packet system (EPS)fallback; receiving an indication to establish a voice call; transmitting a service request to the first wireless system; receiving a radio resource control (RRC) release message redirecting the wireless device to a second wireless system; initiating a connection procedure with the second wireless system; receiving an indication to cancel the voice call; stopping the connection procedure with the second wireless system in response to the indication to cancel; and reconnecting to the first wireless system.

Example 15 comprises the subject matter of example 14, wherein the voice call comprises an emergency voice call and further comprising receiving an indication that the first wireless system supports emergency service fallback.

According to Example 16, a method for cancelling a call, the method comprising: connecting, by a wireless device, to a first wireless system; receiving an indication that the first wireless system supports evolved packet system (EPS)fallback; receiving an indication to establish a voice call; transmitting a service request to the first wireless system; receiving a radio resource control (RRC) release message redirecting the wireless device to a second wireless system; initiating a registration procedure with the second wireless system; receiving an indication to cancel the voice call; and reconnecting to the first wireless system after completing the registration procedure with the second wireless system in response to the indication to cancel.

Example 17 comprises the subject matter of example 16, wherein the voice call comprises an emergency voice call and further comprising receiving an indication that the first wireless system supports emergency service fallback.

According to Example 18, a wireless device comprising: an antenna; a radio operably coupled to the antenna; and a processor operably coupled to the radio, wherein the wireless device is configured to: connect, by a wireless device, to a first wireless system; receive an indication that the first wireless system supports emergency service fallback; receive an indication to establish an emergency voice call; transmit an emergency service request to the first wireless system; determine that an unexpected error has occurred; select a second wireless system based on the determination that the unexpected error has occurred; and connect to the second wireless system to complete the emergency voice call.

Example 19 comprises the subject matter of example 18, wherein the wireless device is configured to determine the unexpected error has occurred by receiving a service request rejected for the emergency service request.

Example 20 comprises the subject matter of example 18, wherein the received service request rejected message results in at least one of a tracking area not allowed, roaming not allowed, congestion, N1 mode not allowed, or restricted service area, error message on the wireless device.

Example 21 comprises the subject matter of example 18, wherein the wireless device is configured to determine the unexpected error has occurred by: determining, by the wireless device, an expected message from the first wireless network has not been received; and determining that at least one of a T3517 expiry, access barred, or lower layer failure has occurred.

Example 22 comprises the subject matter of example 18, wherein the wireless device is configured to determine that the unexpected error has occurred by: receiving a radio resource control (RRC) release message in response to the emergency service request; and determining that the RRC release message does not include redirection information.

Example 23 comprises the subject matter of example 18, wherein the wireless device is further configured to transmit a registration update request, and wherein the wireless device is configured to determine the unexpected error has occurred by receiving a registration update rejection.

Example 24 comprises the subject matter of example 18, wherein the wireless device is further configured to transmit a registration update request, and wherein the wireless device is configured to determine the unexpected error has occurred by determining, by the wireless device, an expected message from the first wireless network has not been received.

Example 25 comprises the subject matter of example 18, wherein the wireless device is configured to determine the unexpected error has occurred by determining that a network congestion timer is running.

Example 26 comprises the subject matter of example 18, wherein the second wireless system comprises a 5G new radio wireless system.

Example 27 comprises the subject matter of example 18, wherein the second wireless system comprises a 4G long term evolution wireless system.

According to Example 28, a wireless device configured to perform any action or combination of actions as substantially described herein in the Detailed Description as included in the wireless device.

According to Example 29, a non-volatile computer-readable medium that stores instructions that, when executed, cause the performance of any action or combination of actions as substantially described herein in the Detailed Description.

According to Example 30, an integrated circuit configured to perform any action or combination of actions as substantially described herein in the Detailed Description.

Yet another exemplary aspect may include a method, comprising, by a device, performing any or all parts of the preceding Examples.

A yet further exemplary aspect may include a non-transitory computer-accessible memory medium comprising program instructions which, when executed at a device, cause the device to implement any or all parts of any of the preceding Examples.

A still further exemplary aspect may include a computer program comprising instructions for performing any or all parts of any of the preceding Examples.

Yet another exemplary aspect may include an apparatus comprising means for performing any or all of the elements of any of the preceding Examples.

Still another exemplary aspect may include an apparatus comprising a processor configured to cause a device to perform any or all of the elements of any of the preceding Examples.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Aspects of the present disclosure may be realized in any of various forms. For example, some aspects may be realized as a computer-implemented method, a computer-readable memory medium, or a computer system. Other aspects may be realized using one or more custom-designed hardware devices such as ASICs. Still other aspects may be realized using one or more programmable hardware elements such as FPGAs.

In some aspects, a non-transitory computer-readable memory medium may be configured so that it stores program instructions and/or data, where the program instructions, if executed by a computer system, cause the computer system to perform a method, e.g., any of a method aspects described herein, or, any combination of the method aspects described herein, or, any subset of any of the method aspects described herein, or, any combination of such subsets.

In some aspects, a device (e.g., a UE 106, a BS 102, a network element 600) may be configured to include a processor (or a set of processors) and a memory medium, where the memory medium stores program instructions, where the processor is configured to read and execute the program instructions from the memory medium, where the program instructions are executable to implement any of the various method aspects described herein (or, any combination of the method aspects described herein, or, any subset of any of the method aspects described herein, or, any combination of such subsets). The device may be realized in any of various forms.

Although the aspects above have been described in considerable detail, numerous variations and modifications will become apparent to those skilled in the art once the above disclosure is fully appreciated. It is intended that the following claims be interpreted to embrace all such variations and modifications.

What is claimed is:

1. A method performed by a wireless device for establishing a voice call, the method comprising:
    receiving an indication that a first wireless system supports emergency service fallback;
    receiving an indication to establish an emergency voice call;
    transmitting an emergency service request to the first wireless system;
    determining that an unexpected error has occurred, wherein the determining comprises determining that a network congestion timer is running;
    selecting a second wireless system based on the determination that the unexpected error has occurred; and
    connecting to the second wireless system to complete the emergency voice call.

2. The method of claim 1, wherein the first wireless system comprises a 5G new radio (NR) wireless system, and wherein the second wireless system comprises a 4G long term evolution (LTE) wireless system.

3. A wireless device comprising:
    an antenna;
    a radio operably coupled to the antenna; and
    a processor operably coupled to the radio,
    wherein the wireless device is configured to:
        receive an indication that a first wireless system supports emergency service fallback;
        receive an indication to establish an emergency voice call;
        transmit an emergency service request to the first wireless system;
        determine that an unexpected error has occurred, wherein determining comprises determining that a network congestion timer is running;
        select a second wireless system based on the determination that the unexpected error has occurred; and
        connect to the second wireless system to complete the emergency voice call.

4. The wireless device of claim 3, wherein the first wireless system comprises a 5G new radio (NR) wireless system, and wherein the second wireless system comprises a 4G long term evolution (LTE) wireless system.

5. A non-transitory computer-readable medium that stores instructions that, when executed, cause performance of the following actions by a wireless device:
    receiving an indication that a first wireless system supports emergency service fallback;
    receiving an indication to establish an emergency voice call;
    transmitting an emergency service request to the first wireless system;
    determining that an unexpected error has occurred, wherein determining comprises determining that a network congestion timer is running;
    selecting a second wireless system based on the determination that the unexpected error has occurred; and
    connecting to the second wireless system to complete the emergency voice call.

6. The non-transitory volatile computer-readable medium of claim 5, wherein the first wireless system comprises a 5G new radio (NR) wireless system, and wherein the second wireless system comprises a 4G long term evolution (LTE) wireless system.

* * * * *